(12) United States Patent
Monahan et al.

(10) Patent No.: US 10,012,506 B1
(45) Date of Patent: Jul. 3, 2018

(54) NAVIGATION GUIDANCE SYSTEM AND METHOD OF USE

(71) Applicants: Peter Monahan, Alpharetta, GA (US); Denisse Siqueiros, Roswell, GA (US)

(72) Inventors: Peter Monahan, Alpharetta, GA (US); Denisse Siqueiros, Roswell, GA (US)

(73) Assignee: DNP Technology, Roswell, GA (US)

( * ) Notice: Subject to any disclaimer, the term of this patent is extended or adjusted under 35 U.S.C. 154(b) by 0 days.

(21) Appl. No.: 14/727,080

(22) Filed: Jun. 1, 2015

Related U.S. Application Data

(60) Provisional application No. 62/098,105, filed on Dec. 30, 2014, provisional application No. 62/006,244, filed on Jun. 1, 2014.

(51) Int. Cl.
| | |
|---|---|
| *G01C 21/00* | (2006.01) |
| *G08B 21/08* | (2006.01) |
| *G08B 23/00* | (2006.01) |
| *G01S 7/497* | (2006.01) |
| *G01C 21/20* | (2006.01) |
| *A63B 71/08* | (2006.01) |

(52) U.S. Cl.
CPC ............ *G01C 21/20* (2013.01); *A63B 71/08* (2013.01); *G01S 7/4972* (2013.01); *G08B 21/088* (2013.01)

(58) Field of Classification Search
None
See application file for complete search history.

(56) References Cited

U.S. PATENT DOCUMENTS

| | | |
|---|---|---|
| 3,802,088 A | 4/1974 | Barrett et al. |
| 4,103,279 A | 7/1978 | Dildy, Jr. et al. |
| (Continued) | | |

FOREIGN PATENT DOCUMENTS

| | | |
|---|---|---|
| CA | 476789 A | 9/1951 |
| CN | 201132044 Y | * 10/2008 |
| (Continued) | | |

OTHER PUBLICATIONS http://www.swimiolite.com.
(Continued)

*Primary Examiner* — Thomas G Black
*Assistant Examiner* — Demetra R Smith-Stewart
(74) *Attorney, Agent, or Firm* — Thomas | Horstemeyer, LLP

(57) ABSTRACT

A navigation guidance system utilizes an electronic compass to determine a desired linear travel path between two way points and to monitor a direction of travel of a user. The system then determines if the direction of travel is within an established tolerance. If the system determines that the direction of travel is outside of the established tolerance, the system alerts the user through one or more alert indicator components. The alert indicator component can emit a visual alert, an audible alert, a tactile alert, or any other suitable method for informing the user accordingly. The alert can be a simple alert or of varying degrees to inform the user of the magnitude of deviation from the desired travel path. The navigation guidance system can be integrated into a carrying device, such as a pair of goggles, swim goggles, glasses, sunglasses, a helmet, a mountable enclosure, etc.

27 Claims, 18 Drawing Sheets

(56) References Cited

U.S. PATENT DOCUMENTS

| | | | |
|---|---|---|---|
| 5,187,871 A * | 2/1993 | McDermott | B63C 11/12 2/430 |
| 5,402,188 A * | 3/1995 | Wayne | A63B 33/002 2/426 |
| 6,086,379 A | 7/2000 | Pendergast et al. | |
| 6,366,856 B1 | 4/2002 | Johnson | |
| 6,452,544 B1 * | 9/2002 | Hakala | G01C 21/20 342/357.31 |
| 6,868,360 B1 * | 3/2005 | Olstad | B63C 11/26 702/150 |
| 6,907,118 B2 | 6/2005 | Henderson et al. | |
| 7,192,137 B2 * | 3/2007 | Ishibashi | A61F 9/02 351/158 |
| 7,310,063 B1 * | 12/2007 | Brown | B63C 11/205 128/201.11 |
| 7,543,934 B2 * | 6/2009 | Howell | G01C 22/006 351/158 |
| 7,648,236 B1 * | 1/2010 | Dobson | G02C 11/10 345/8 |
| 7,810,750 B2 | 10/2010 | Abreu | |
| 8,540,363 B2 | 9/2013 | Abreu | |
| 8,788,197 B2 | 7/2014 | Fink | |
| 8,810,482 B2 | 8/2014 | Abdollahi et al. | |
| 8,842,003 B2 | 9/2014 | Huston | |
| 8,868,342 B2 * | 10/2014 | Balloga | G01C 3/04 356/8 |
| 9,079,060 B2 * | 7/2015 | Hong | |
| 9,086,286 B2 | 7/2015 | Long et al. | |
| 9,146,124 B2 * | 9/2015 | Parada | G01C 21/365 |
| 9,329,273 B1 * | 5/2016 | Mazzagatti, Jr. | G01S 19/19 |
| 2004/0167714 A1 * | 8/2004 | Macphail | G01S 19/49 701/469 |
| 2007/0248238 A1 | 10/2007 | Abreu | |
| 2008/0036653 A1 | 2/2008 | Huston | |
| 2008/0066331 A1 | 3/2008 | Brzezinski et al. | |
| 2008/0144854 A1 | 6/2008 | Abreu | |
| 2010/0030482 A1 | 2/2010 | Li | |
| 2011/0051982 A1 | 3/2011 | Abreu | |
| 2011/0054834 A1 | 3/2011 | Partridge et al. | |
| 2011/0128824 A1 * | 6/2011 | Downey | A63B 24/0021 368/14 |
| 2012/0009553 A1 * | 1/2012 | Ben-Tal | A63B 24/0062 434/254 |
| 2012/0210489 A1 | 8/2012 | Abreu | |
| 2012/0220234 A1 | 8/2012 | Abreu | |
| 2013/0096819 A1 * | 4/2013 | Tarnok | G01C 21/00 701/428 |
| 2013/0187786 A1 * | 7/2013 | Dadlani Mahtani | A61F 9/029 340/691.8 |
| 2013/0222235 A1 | 8/2013 | Abdollahi et al. | |
| 2013/0278631 A1 | 10/2013 | Border et al. | |
| 2013/0297460 A1 | 11/2013 | Spivack | |
| 2014/0078462 A1 | 3/2014 | Abreu | |
| 2014/0172296 A1 * | 6/2014 | Shtukater | G01S 19/13 701/522 |
| 2014/0223647 A1 | 8/2014 | Long et al. | |
| 2015/0025794 A1 | 1/2015 | Long et al. | |
| 2015/0042476 A1 | 2/2015 | Holm et al. | |

FOREIGN PATENT DOCUMENTS

| | | | |
|---|---|---|---|
| CN | 202502317 U * | 10/2012 | |
| DE | 102009060683 A1 * | 1/2011 | A63B 33/002 |
| EP | 2212215 B1 | 2/2012 | |
| EP | 2555988 A1 | 6/2014 | |
| WO | WO 2009130341 A1 * | 10/2009 | A63B 33/002 |
| WO | WO 2011025327 A2 | 3/2011 | |
| WO | WO 2011124552 A1 | 10/2011 | |
| WO | WO 2015038527 A1 * | 3/2015 | A63B 71/0622 |

OTHER PUBLICATIONS http://www.finisinc.com/Hydro-Tracker-GPS.
http://www.zealoptics.com/gps-collection.
http://www.instabeat.me/.

* cited by examiner

NAVIGATION GUIDANCE SYSTEM AND METHOD OF USE

CROSS-REFERENCE TO RELATED APPLICATIONS

This Utility Application is a Non-Provisional Patent Application claiming the benefit of:
U.S. Provisional Patent Application Ser. No. 62/098,105, filed on Dec. 30, 2014, and
U.S. Provisional Patent Application Ser. No. 62/006,244, filed on Jun. 1, 2014,
both of which are included by reference in their entireties.

FIELD OF THE INVENTION

The present disclosure generally relates to an electronic navigation guidance system integral with eyewear or other headwear apparatus. More particularly, the present disclosure relates to an electronic navigation guidance system utilizing an electronic compass in combination with other sensing devices, such as an electronic motion sensor, to provide navigational guidance to a user.

BACKGROUND OF THE INVENTION

The present disclosure generally relates to an electronic navigation guidance system integral with eyewear or other headwear apparatus. More particularly, the present disclosure relates to an electronic navigation guidance system utilizing an electronic compass in combination with an electronic motion sensor to provide navigational guidance to a user.

People undertake a wide variety of activities that involve traveling along a predetermined path or course. Examples include swimming, walking, hiking, running, bicycling, snorkeling, diving, and the like. It is well recognized that the shortest distance along the path can save time. This becomes an important factor when the person is a participant competing against other participants and/or time in a sporting event.

Global Positioning System (GPS) based navigational systems provide navigation instructions to a user. The GPS based navigation systems are fraught with limitations. The GPS based navigation systems consume a significant amount of power, thus mandating a large battery or other portable power source when used continuously. It is unlikely that the GPS coordinates in a sporting or recreational event would be known in advance. Typically a Graphic User Interface (GUI) with a touch-screen and/or other input device would be required. If a GPS based navigation system is not equipped with a Graphic User Interface or input device, then an external computing device with a GUI and an associated input device would be required to program the navigation device prior to a sporting event. A GPS based navigation system that interprets an initial direction of travel over a short distance to establish an automatic heading is flawed as an event participant/competitor may begin to travel in a wrong direction at the start of a sporting event; this incorrect data would then be used to send the competitor off course. The GPS based navigation system requires a significant amount of time to determine the initial location of the device. This delay could impact a user in a sporting event. A GPS based system refers to and relies upon a specific Constellation of Satellites owned and deployed by the United States of America and cannot take advantage of multiple satellite constellations.

The GPS based navigation systems are limited or possibly even ineffective in certain circumstances, such as indoors, underground, at depths below a water's surface, and the like. It is recognized that the accuracy of the GPS based system is proportional to the number of signals received from different satellites. Using a GPS Satellite Constellation has inherent limitations. One example of a limitation is a condition where the system is used in a far North geographic region or a far South geographic region, better defined by those having high latitudes. Obtaining a GPS signal in these regions can be problematic. This limitation is overcome by using a global navigation satellite system (GNSS), which can rely upon a Globalnaya navigatsionnaya sputnikovaya sistema, or "GLObal NAvigation Satellite System" GLONASS constellation, a BeiDou Satellite Constellation, a Galileo Satellite Constellation, in addition or as an alternative to the GPS Satellite Constellation. The broader availability to a broader number of Satellite Constellations increases the accuracy of the system as well as providing a broader geographic coverage.

In the proposed application, the navigation guidance system could be employed to aid a user in navigating along a predetermined course defined by waypoints. It is unlikely that a course may be mapped out in advance, such as by longitude and latitude coordinates, GPS coordinates, and the like, thus limiting an ability for programming the course into the device.

Professional and amateur athletes compete against either one another and/or time in an event by traversing a predetermined course. Examples include swimming, running, bicycling, skiing, and the like. During the competition, it is desirous to travel along the shortest distance. By reducing the overall distance traveled, the competitor reduces their overall time. The same can be applied to non-competition activities that involve courses, such as hiking, training, and the like.

What is desired is a compact navigation solution having a low power consumption adapted for use during a sporting event or other activity requiring navigational assistance.

SUMMARY OF THE INVENTION

The general concept is directed towards a navigational aid adapted for use during a sporting event requiring a participant to traverse a course or any other activity where an individual would enjoy aid from navigational assistance.

In accordance with one embodiment of the present invention, the invention consists of a navigation guidance system comprising:
A) an enclosure,
B) a controller circuit comprising a microprocessor;
C) an electronic memory device in signal communication with the controller circuit;
D) an electronic compass in signal communication with the controller circuit;
E) a user interface in signal communication with the controller circuit; and
F) a portable power supply in electrical communication with each electrically operated device,
   wherein the controller circuit, the electronic memory, the electronic compass, and the portable power supply are carried by the enclosure,
   wherein the controller circuit is operated in accordance with an operational set of instructions, the operational set of instructions including:

establishing a prescribed course based upon an initial location and at least one subsequent, sequentially considered waypoint, establishing a compass direction from one waypoint to a sequentially arranged waypoint along the prescribed course, activating a navigational assistant portion of the operational set of instructions;

establishing a compass heading associated with a direction for travel;

determining any necessary corrections to maintain travel along the established compass heading; and providing associated feedback to the user in a manner to at least one of:

ensure the user maintains travel in accordance with the established compass heading, and provide guidance to the user to return to the established compass heading.

In a second aspect, the navigation guidance system further comprises components providing a function to provide navigational guidance to a user to optimize travel to remain along a straight line between two way points.

In another aspect, the device is utilized as a direction assistant, providing guidance based upon an established compass heading. The user would approach a waypoint, determining and conveying a new compass heading to the device, and set the new compass heading accordingly. The method of determining and conveying the compass heading can be accomplished by any suitable method. In the exemplary embodiment, the device would be provided in a form of goggles and would be worn on the user's head. The user would look at the next waypoint marker along the course and activate the compass heading establishing or waypoint confirmation entry feature. The activation process would be determined by the selected configuration integrated for use as the compass heading establishing or waypoint confirmation entry feature. Using the lowest collection of components, the device provides a basic solution to the user. Essentially, the lowest tier version enables the user to simply "point and shoot", or more specifically, aim the device towards a next target waypoint and establish a compass heading direction by activating a user input device (referencing the compass heading establishing or waypoint confirmation entry feature). Subsequently, the user begins traveling in a direction substantially in accordance with the established compass heading. As the user travels, the device monitors the actual direction of travel, compares the actual direction of travel to the established compass heading and an acceptable tolerance and provides feedback to the user. The navigational guidance can be provided at least one of:

navigational guidance to turn in a right direction when the current direction of travel is beyond a predetermined acceptable tolerance extending leftward from the established compass heading, navigational guidance to turn in a left direction when the current direction of travel is beyond a predetermined acceptable tolerance extending rightward from the established compass heading, and navigational guidance indicating that the current direction of travel is within the tolerance band from the established compass heading.

In yet another aspect, the process would be repeated as the user passes each waypoint along a predetermined course. In one version, the system can be designed to forget each previous compass heading upon establishment of a current compass heading. In a second version, the system can be designed to store each sequential compass heading upon establishment of the each sequential compass heading, thus storing a series of sequential compass headings of a course for future use.

In yet another aspect, the device can optionally include higher tier features, including any of a variety of features; one of which is a preprogrammed course. Programming can be provided using wired or wireless technology. Programming would be accomplished by providing signal communication between a programming station and the device. Wired technology would utilize an electro-mechanical connector. It is noted that although wired technology provides a technologically simpler solution, the use of a connector potentially complicates a waterproof enclosure solution. Conversely, while enabling a simple and more reliable waterproof enclosure solution, wireless technology provides a technologically more advanced solution that also requires consideration for power consumption. An active or passive wireless communication interface can be employed to provide signal communication between the programming station and the device. The proposed design would be respective to the target application.

In yet another aspect, an alternative method of programming can be accomplished by traversing the predefined course and entering waypoints by activating the waypoint confirmation entry feature. This would generate and store a compass heading in a data file associated with the specific course, wherein the data file would be stored in the digital memory component of the device.

In yet another aspect, in operation, the user activates the device. The device can be activated by toggling a switch, providing motion to the device (in a design incorporating a motion sensing device), or any other method known by those skilled in the art. When necessary, the user would calibrate the device to determine magnetic north. The calibration process would conclude when the device confirms that magnetic north has been successfully determined. The user would secure the device to themselves, wherein the method of securing the device would be respective to the selected form factor thereof. Using goggles as an example, the user would place the goggles over the head, covering their eyes. This would orient the compass parallel to the user's viewing direction. The user would position themselves at a starting location and orient their head look directly towards the first waypoint. The user then activates the input device to establish a compass heading directed towards the first waypoint. It is preferred that the device provides feedback to the user that the input was received. The system can optionally include a step requiring the user to confirm the setting. In one example, the user can rotate their head until the device identifies the established compass heading. This should orient the user's head directed towards the target waypoint. In a condition where the established compass heading is determined to be correct, the user would affirm the established compass heading. In a condition where the established compass heading is determined to be incorrect, the user would restart the process of establishing a compass heading to the target waypoint. Once the established compass heading is determined to be correct, the user can then begin to navigate to the first target waypoint. The device would monitor the direction of travel and provide the respective navigational feedback to the user. The navigational guidance would provide the appropriate feedback, such as:

navigational guidance to turn in a right direction when the current direction of travel is beyond a predetermined acceptable tolerance extending leftward from the established compass heading, navigational guidance to turn in a left direction when the current direction of travel is beyond a predetermined acceptable tolerance extending rightward from the established compass heading, or navigational guidance indicating that the current direction of travel is within the tolerance band from the established compass heading.

In another aspect, the navigation guidance system further comprises a user alert component. The user alert component can be a visual alerting element, an audible alerting element, a tactile alerting element (such as a vibratory device (an off balanced motor, a piezoelectric vibrator, a pancake vibrating motor, and the like), a pressure device, and the like), or any other suitable alerting element.

In yet another aspect, the visual alerting element can be provided as a pair of spatially located light emitting devices (such as an LED, an incandescent bulb, and the like)

In yet another aspect, the visual alerting element can be provided as a multi-color emitting device, such as a multi-colored Light Emitting Diode (multi-colored LED), wherein the multi-colored LED can emit different colors to convey a magnitude of a deviation from a programmed optimal travel path. For example, the multi-colored LED can emit a green light when the user is traveling within an acceptable tolerance of the programmed optimal travel path. The multi-colored LED can emit a yellow or amber light when the user is traveling slightly outside of the acceptable tolerance of the programmed optimal travel path. The multi-colored LED can emit a red light when the user is traveling significantly outside of the acceptable tolerance of the programmed optimal travel path.

In yet another aspect, a tolerance can be established using an angle. The tolerance and/or angle can be preprogrammed or programmable. The programmable tolerance and/or angle can be entered by a service person, a user, or any other individual.

In yet another aspect, a magnitude of the deviation can be established using a plurality of angles. The angles can be multiples of one another or distinctly defined.

In yet another aspect, the visual alerting element can be provided as a series of spatially located light emitting devices, wherein the spatially located light emitting devices can be illuminated at varying degrees to convey the magnitude of the deviation from the programmed optimal travel path.

In yet another aspect, the user interface is one or more tactile entry devices, such as a button, a switch, a momentary switch, a rocker switch, a capacitance switching device, or any other user entry device that enables a change in a circuit that is identified as an input.

In yet another aspect, the user interface is a pneumatic user input device, such as a blowpipe, pressurized, sealed bladder (bulb), and the like.

In yet another aspect, the navigation guidance system can optionally further include a motion sensing device. The motion sensing device can be a motion sensor, an accelerometer, or any other suitable motion sensing device. The motion sensing device can support optional features, such as:

activation of the navigation guidance system;

a sleep mode, where the navigation guidance system would be essentially turned off to conserve power after a period of time of non-use (lack of indication of any motion);

for use in calibrating the electronic compass to determine true north;

for use in compass calibration and tilt compensation, during times of movement;

establishing a new compass heading respective to a direction towards a next target waypoint by using a pre-established motion or sequence of motions;

a method of determining a velocity (speed and direction) of the user; and a cadence (based upon different directions of motion).

In yet another aspect, the compass calibration, and compass accuracy can be adapted to compensate for pitch roll and yaw or other forces during use.

In yet another aspect, the navigation guidance system can optionally further include an electronic level. The electronic level can support optional features, such as:

an ability to compensate for motions of the user's head or other motions the device may be subjected to during use; and a cadence.

In yet another aspect, the cadence is based upon one of:

repeating changes in level, an identified change in at least one force, an identified change in inertia, and an identified change in an angular rate.

In yet another aspect, the electronic level can be a multi-axis gyroscope or any other form of electronic component or system capable of determining an orientation thereof.

In yet another aspect, the navigation guidance system can optionally further include a light sensor, whereby the controller circuit can utilize output from the light sensor to determine a level of ambient light and adjust an intensity level of the light emitted from the visual alert component/components.

In yet another aspect, the navigation guidance system can optionally further include a recharging circuit. The recharging circuit can obtain power through an electromechanical connector, a passive power receiver, and any other suitable power transfer solution.

In yet another aspect, the navigation guidance system can optionally further include a global navigation satellite system (GNSS) receiver circuit. The circuit would be in signal communication with an associated global navigation satellite system (GNSS) receiving antenna.

In yet another aspect, the global navigation satellite system (GNSS) receiver would acquire signals from multiple satellite constellations such as a Globalnaya navigatsionnaya sputnikovaya sistema), or "GLObal NAvigation Satellite System" GLONASS constellation, a BeiDou Satellite Constellation, a Galileo Satellite Constellation, in addition or as an alternative to the GPS Satellite Constellation, resulting in much faster performance with greater and more stable accuracy than a single constellation system. The GNSS information would be used to determine a correction factor to compensate for a secondary impact to the direction of travel of the user, such as a lateral drift resulting from a flow of a current within the water and/or effects of wind, wherein the current is angled respective to the direction of travel of the user.

In yet another aspect, the GNSS receiver can optionally provide verification, error correction and/or compensation of at least one of the electronic compass itself and the electronic compass heading.

In yet another aspect, the GNSS receiver can optionally provide data to synchronize the date and time information with the controller circuit thus eliminating the need for an external clock or crystal to maintain accurate time.

In yet another aspect, the navigation guidance system can be integrated into a pair of goggles.

In yet another aspect, the navigation guidance system can be integrated into a goggle cover for a pair of goggles.

In yet another aspect, the goggles cover can be removably attached to the pair of goggles by at least one of:
- a feature that removably attaches the goggles cover to a strap of the pair of goggles,
- a feature that removably attaches the goggles cover to a bridge member of the pair of goggles,
- a feature that removably attaches the goggles cover to the pair of goggles using a magnetic attraction,
- a feature that removably attaches the goggles cover to the pair of goggles using a mechanical connection,
- a feature that removably attaches the goggles cover to the pair of goggles using a mechanical connection, wherein the mechanical connection is at least one of a snap, a hook, a friction fit, and the like, and
- a feature that removably attaches the goggles cover to an outer peripheral edge of the pair of goggles using a mechanical connection,
- a feature that removably attaches the goggles cover to an outer peripheral edge of the pair of goggles using a mechanical connection, wherein the feature is a goggles body receptacle,
- a feature that removably attaches the goggles cover to an outer peripheral edge of the pair of goggles using a mechanical connection, wherein the feature is a goggles body receptacle formed as a "C-shaped" channel, and
- a feature that removably attaches the goggles cover to an outer peripheral edge of the pair of goggles using a mechanical connection, wherein the feature is a goggles body receptacle formed as a "C-shaped" channel circumscribing at least a portion of an outer peripheral edge of the goggles cover.

In yet another aspect, the goggles cover can be permanently attached to the pair of goggles. The goggles cover can be permanently attached to the pair of goggles using a bonding agent, an adhesive, an ultrasonic welding process, a radio frequency (RF) welding process, mechanical fasteners, heat fusion, and the like.

In yet another aspect, the goggles cover further comprises a goggles cover frame and a navigation PCA encapsulating cover.

In yet another aspect, the goggles cover further comprises a cavity located between the goggles cover frame and the navigation PCA encapsulating cover.

In yet another aspect, the navigation guidance printed circuit assembly (PCA) comprising functional components of the navigation guidance system is assembled to the goggles cover within the channel formed between the goggles cover frame and the navigation PCA encapsulating cover.

In yet another aspect, at least a portion of the navigation PCA encapsulating cover is manufactured having a clear or translucent material.

In yet another aspect, at least one of the goggles cover frame and the navigation PCA encapsulating cover includes a visual alert support element, wherein the visual alert support element is configured to carry the visual alert element.

In yet another aspect, the goggles cover frame and the navigation PCA encapsulating cover include a respective visual alert support element, wherein the visual alert support element is configured to carry the visual alert element when assembled to one another.

In yet another aspect, the navigation guidance system can be integrated into a diving mask.

In yet another aspect, the navigation guidance system can be integrated into a pair of glasses, sunglasses, and the like.

In yet another aspect, the navigation guidance system can be integrated into a helmet.

In yet another aspect, the navigation guidance system can be integrated into an enclosure, wherein the enclosure is adapted to be worn by an individual.

In yet another aspect, the navigation guidance system can be integrated into an enclosure, wherein the enclosure is adapted to be secured to an object, such as a bicycle, rowing shell or scull, and the like. These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF THE INVENTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 2:
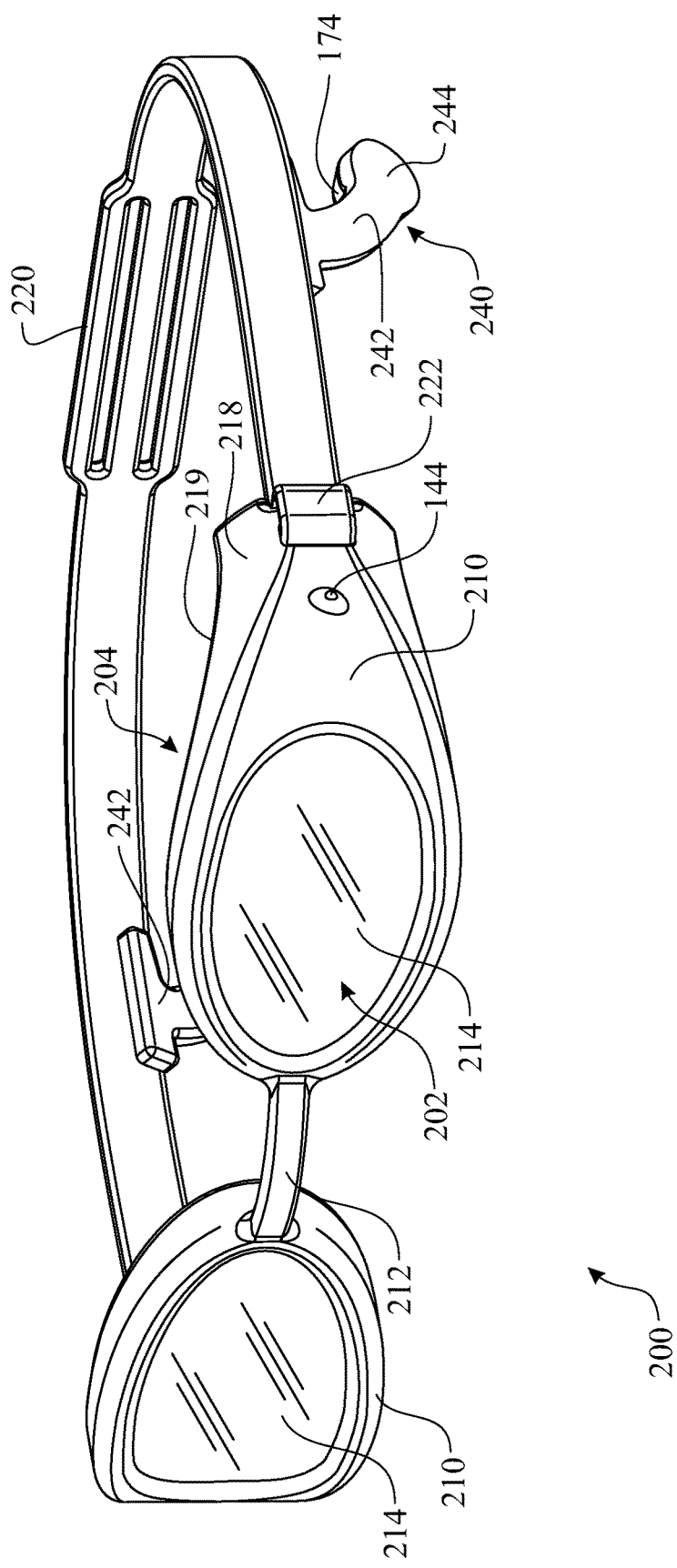
FIG. 2 presents an isometric front view of a first exemplary implementation of the navigation guidance system, wherein the navigation guidance system is integrated into a pair of swim goggles.

For purposes of description herein, the terms "upper", "lower", "left", "rear", "right", "front", "vertical", "horizontal", and derivatives thereof shall relate to the invention as oriented in FIG. 2. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

An individual can participate in an event where it would benefit the individual to remain on an optimal course, which would reduce a total distance traveled, thus reducing an associated time. This becomes significant when the individual is participating in a competition, such as swimming, bicycling, and the like. Swimming competitions, in particular, map out a point-to-point course for the participants. The swimmer rarely looks forward where they are headed and relies upon their instinct and stroke to direct them towards a target destination. When a swimmer does look up for the purpose of sighting the destination, valuable time and energy are lost.

Figure 1:
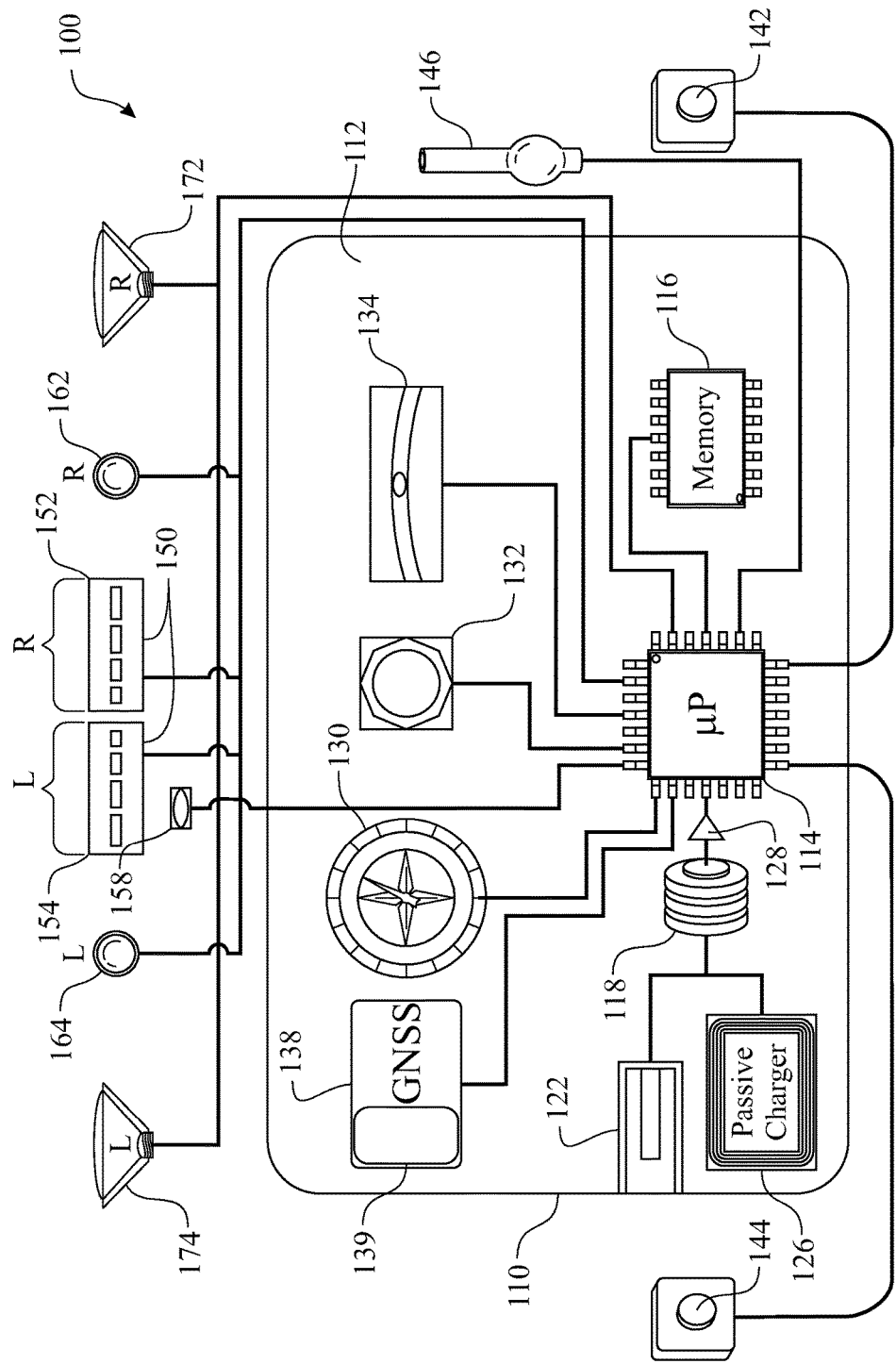
FIG. 1 presents a schematic block diagram introducing the various components of a navigation guidance system.
Figure 3:
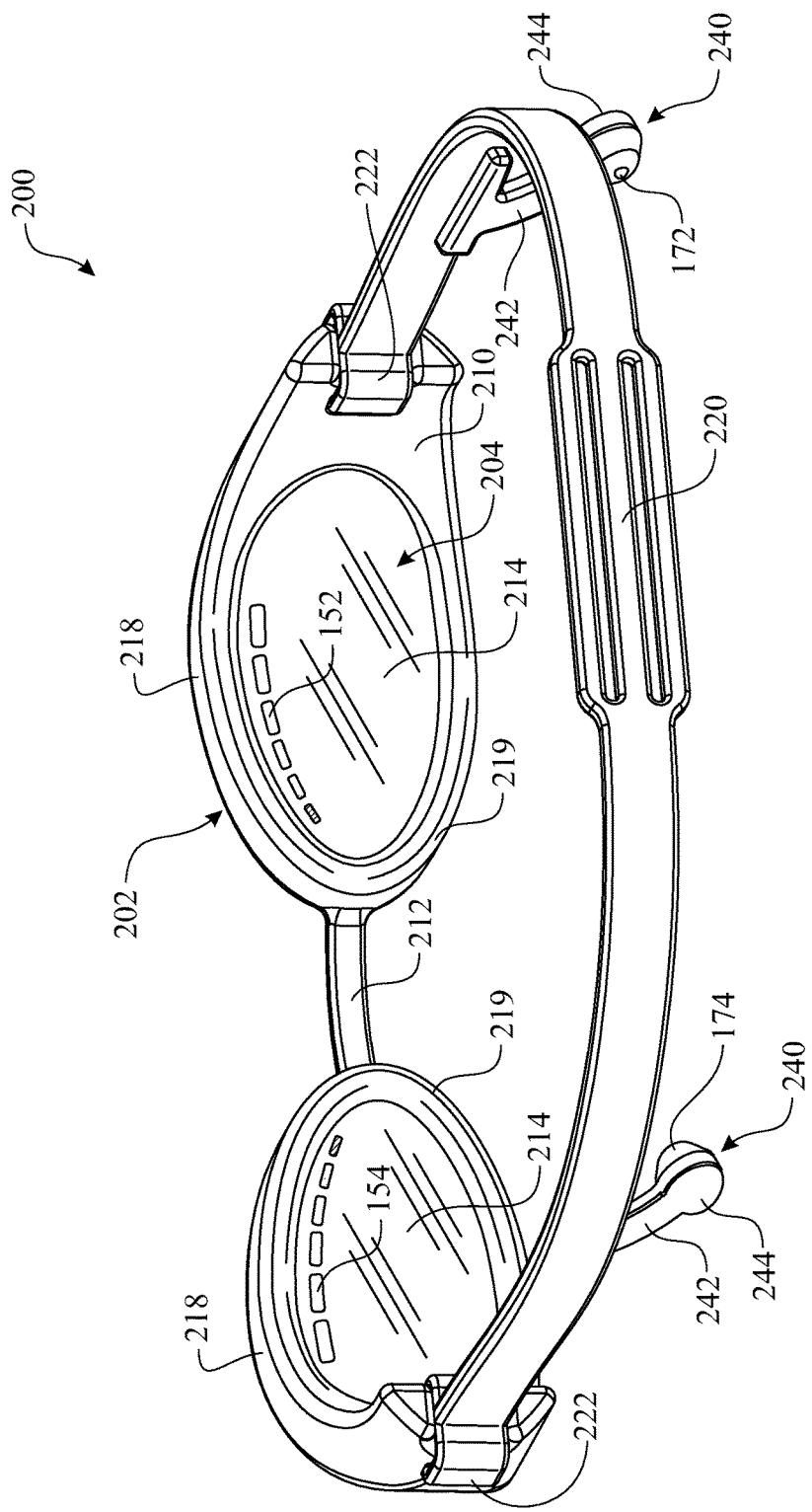
FIG. 3 presents an isometric rear view of the first exemplary implementation of the navigation guidance system as introduced in FIG. 2.

The navigation guidance system 100, as introduced in FIG. 1, can be included within a pair of navigation guidance goggles 200, as shown in FIGS. 2 and 3 to provide a swimmer with a solution that aids the swimmer in optimizing their direction of travel.

The navigation guidance system 100 includes a number of components integrated into a system for monitoring a compass heading of a user's direction of travel and informing the user when the direction of travel deviates from an optimal programmed direction. The goal of the navigation guidance system 100 is to provide guidance to a user to maintain the user on a linear course between two way points.

The navigation guidance system 100 includes a series of electrically operated components integrated into one or more circuits and packaged into an enclosure. The enclosure is preferably adapted for use by an individual while traversing a predetermined path or course. Examples of form factors for the enclosure include: waterproof swimming goggles 200 (or other forms of goggles 200) (FIGS. 2 and 3), eyeglasses or sunglasses 500 (FIG. 9), a cycling helmet 800 (or any other form of helmet 800) (FIG. 18), a wearable computer headset, and the like. Alternatively, the enclosure can be shaped to be carried by or attached to eyeglasses or sunglasses, waterproof swimming goggles (or other forms of goggles), a racing helmet (or any other form of helmet), a wearable computer headset, and the like, such as a goggle cover 750 (FIGS. 14 and 15) which is placed over a supporting object. The enclosure can be formed as a casing (similar to the navigation guidance goggles cover 750) that is placed covering a portion of an entire eyewear assembly or headwear apparatus. In another embodiment, the enclosure can be adapted for attachment to the eyewear 500, helmet 800, or any other headwear form factor. In a less desirable configuration, the enclosure can be adapted to be secured to the user at a location distal from the user's head, wherein the user interface conveys information to the user by any suitable method.

Monitoring and power components of the navigation guidance system 100 can be assembled onto a navigation guidance printed circuit board (PCB) 112. The preferred navigation guidance printed circuit board (PCB) 112 would be a flex circuit enabling shaping adaptability for integration of the navigation guidance system 100 into an adapting device, such as the navigation guidance goggles 200, navigation guidance glasses 500 (FIG. 9), a first navigation guidance goggles cover configuration 650, 750 (FIGS. 10 through 13), a second navigation guidance goggles cover configuration 850 (FIGS. 14 and 15), a navigation guidance helmet 1000 (FIG. 18), and any other suitable adapting device.

The primary functionality of the navigation guidance system 100 is provided by a controller circuit 114. The controller circuit 114 includes a microprocessor and any associated controller components. It is understood that the controller circuit 114 can be a single integrated circuit, referred to as a microcontroller, or comprise a plurality of controller components integrated into a respective circuit to achieve the same result. Alternatively, the controller circuit 114 can simply include a microprocessor when suited for the application. The controller circuit 114 is representative of any controller circuit integrated into the navigation guidance system 100. For example, the controller circuit 114 can be an application-specific integrated circuit (ASIC) such as a field-programmable gate array (FPGA), a complex programmable logic device (CPLD), and the like.

The field-programmable gate array (FPGA) is an integrated circuit designed to be configured by a customer or a designer after manufacturing—hence "field-programmable". The FPGA configuration is generally specified using a hardware description language (HDL), similar to that used for an application-specific integrated circuit (ASIC). The complex programmable logic device (CPLD) is a programmable logic device with complexity between that of Programmable Array Logic (PALs) and FPGAs, and architectural features of both. The main building block of the CPLD is a macrocell, which contains logic implementing disjunctive normal form expressions and more specialized logic operations.

The controller circuit 114 is supported by a digital data storage device 116. It is understood that the digital data storage device 116 can be independent of the controller circuit 114 or integrated into the controller circuit 114. The controller circuit 114 and digital data storage device 116 can be selected from any suitable commercially available options, taking into account speed, power consumption, size, and capability. Power is provided to the navigation guidance system 100 by a portable power supply 118. The portable power supply 118 can be in a form of a battery, a large or super capacitor, a portable power-generating device (such as a solar power converter), or any other suitable portable power source. Power from the portable power supply 118 would be provided to each of the electrically operated components. The navigation guidance printed circuit assembly (PCA) 110 can include a voltage regulator or any other power management components and/or circuitry as needed. Power management can be provided through programming of the controller circuit 114 to minimize power consumption by the navigation guidance system 100. Power can be replenished to the portable power supply 118 through an electro-mechanical connector 122 and/or a passive charger 126. It is understood that the electro-mechanical connector 122 can include a watertight seal for applications where the navigation guidance system 100 would be employed in moist environments, such as those with a potential for exposure to rain, underwater, and the like. Conversely, the passive charger 126 avoids a requirement for an electro-mechanical connection, and therefore can function while remaining sealed within an enclosure. The passive charger 126 would utilize passive transmissive power to transfer energy from a source to a receiver of the passive charger 126. The passive charger 126 would convert the transmitted energy into a current, which is captured as electrical energy. The navigation guidance system 100 can include a power regulation circuit 128 to manage power from a charging input throughout a power distribution network to each of the electronically powered components.

The navigation guidance system 100 would include a variety of sensors, including an electronic compass 130. The electronic compass 130 determines the direction of travel of the user. A motion sensing device 132 can be integrated into the navigation guidance printed circuit assembly (PCA) 110 to provide additional information to aid in determining the direction of travel of the user/device. The motion sensing device 132, such as a motion sensor, an accelerometer, a multi-axis accelerometer, a multi-axis gyroscope, or the like can be employed for other functions, including initializing operation of the navigation guidance system 100. Another offered feature made available by the inclusion of the motion detecting device 132 is a method for calibrating the electronic compass 130, more specifically to compensate for magnetic dip angles of the earth's magnetic fields and accurately establish magnetic heading accuracy regardless of the position of the navigation guidance system 100. The user would rotate the device carrying the navigation guidance system 100 around in a circle for a period of time, enabling the device to calibrate the electronic compass 130. Another offered feature made available by the inclusion of the motion detecting device 132 is a method for activating and deactivating the navigation guidance system 100. The navigation guidance system 100 can be activated upon detection of a motion by the motion detecting device 132. The navigation guidance system 100 can transition into a sleep mode after a predetermined period of time of inactivity determined by a lack of motion as sensed by the motion sensing device 132. Another offered function for the motion detecting device 132 would be the ability to establish and/or update a compass heading. The user would move in accordance to a pre-established motion. The motion can be a single distinct movement or a pattern of distinct movements. The pre-established motion can be pre-programmed, created by a motion of the user, or any other suitable manner. The user's motion is evaluated by navigation guidance system 100 to determine if the motion is in accordance with the pre-established motion to identify a change in compass heading programming. This process avoids any distractions in optimal motion that would result from a requirement of activating a physical user input device 142, 144, 146.

Another offered benefit from the inclusion of the motion detecting device 132; the navigation guidance system 100 can determine and consider a direction and/or rate of travel. A combination of the motion detecting device 132 and the electronic compass 130 enables determination of a velocity (speed and direction). This introduces an ability to program a digital map of a predetermined course into the device and utilize the electronic programmed map to provide navigational assistance to the user. An integrated electronic level 134 can be used to determine a cadence and provide feedback respective to the cadence to the user. Examples of the electronic level 134 include: a gyroscope, such as a multi-axis gyroscope, an electronic microchip-packaged (MEMS) gyroscope found in consumer electronics devices, a solid-state ring laser, a fiber optic gyroscope, and an extremely sensitive quantum gyroscope; a clinometer; an electronic bubble level; and the like.

An optional electronic level 134 can be integrated into the navigation guidance printed circuit assembly (PCA) 110 to determine an offset of the navigation guidance system 100 from a horizontal orientation. The electronic level 134 can introduce information to the controller circuit 114 enabling the controller circuit 114 to mathematically compensate for motions of the user's head or other motions the navigation guidance system 100 may be subjected to during use. A combination of the motion detecting device 132 and the integrated electronic level 134 can be used to determine a cadence and provide feedback respective to the cadence to the user.

User input can be obtained through any suitable user input component. One exemplary user input device is a tactile input component 142, 144. The tactile input component is preferably segmented into a right tactile user input element 142 and a left tactile user input element 144. The right tactile user input element 142 would be located on a right side of the system when integrated into a carrying device and a left tactile user input element 144 would be located on a left side of the system when integrated into a carrying device. Each tactile input component 142, 144 could be labeled as such to inform the user of the appropriate input association. A pneumatic user input device 146 can additionally or alternatively be employed to provide a user input to the controller circuit 114. The employment of the pneumatic user input device 146 allows the user to continue operate the navigation guidance system 100 without their hands. One example of benefit of the pneumatic user input device 146 is the ability to continue an uninterrupted stroke during a swimming competition while using their mouth to operate the navigation guidance system 100.

It is understood that the electronics and other susceptible components can be packaged into a protective enclosure. The protective enclosure can enable access to the electronics. Alternatively, the enclosure can be sealed. For example, the electronics and other susceptible components can be embedded within an overmolded assembly. The protective enclosure would provide protection from any or all of: moisture, weather, temperature, and the like. The protective enclosure can be integral or separate from the carrying device or other components which collectively forming the final useable assembly.

Figure 4:
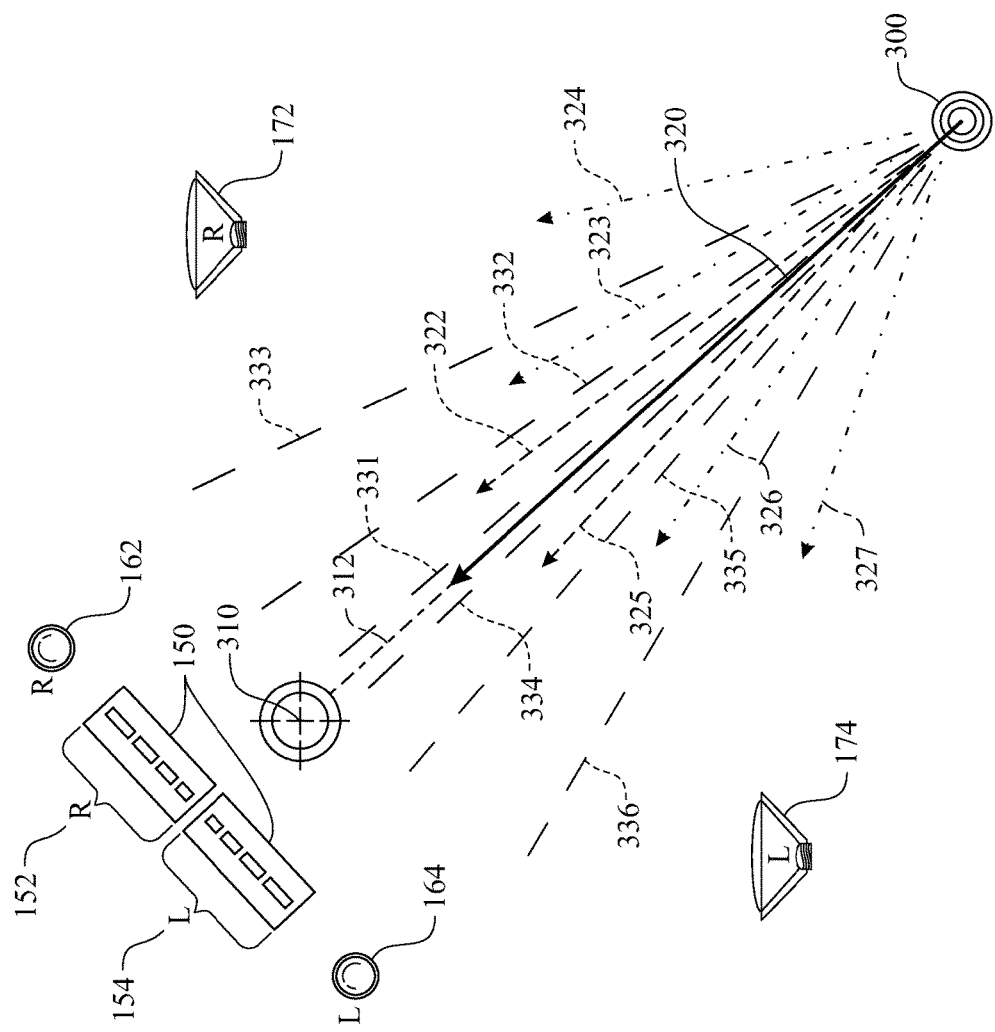
FIG. 4 presents a top view diagram illustrating an operation of the navigation guidance system.
Figure 6:
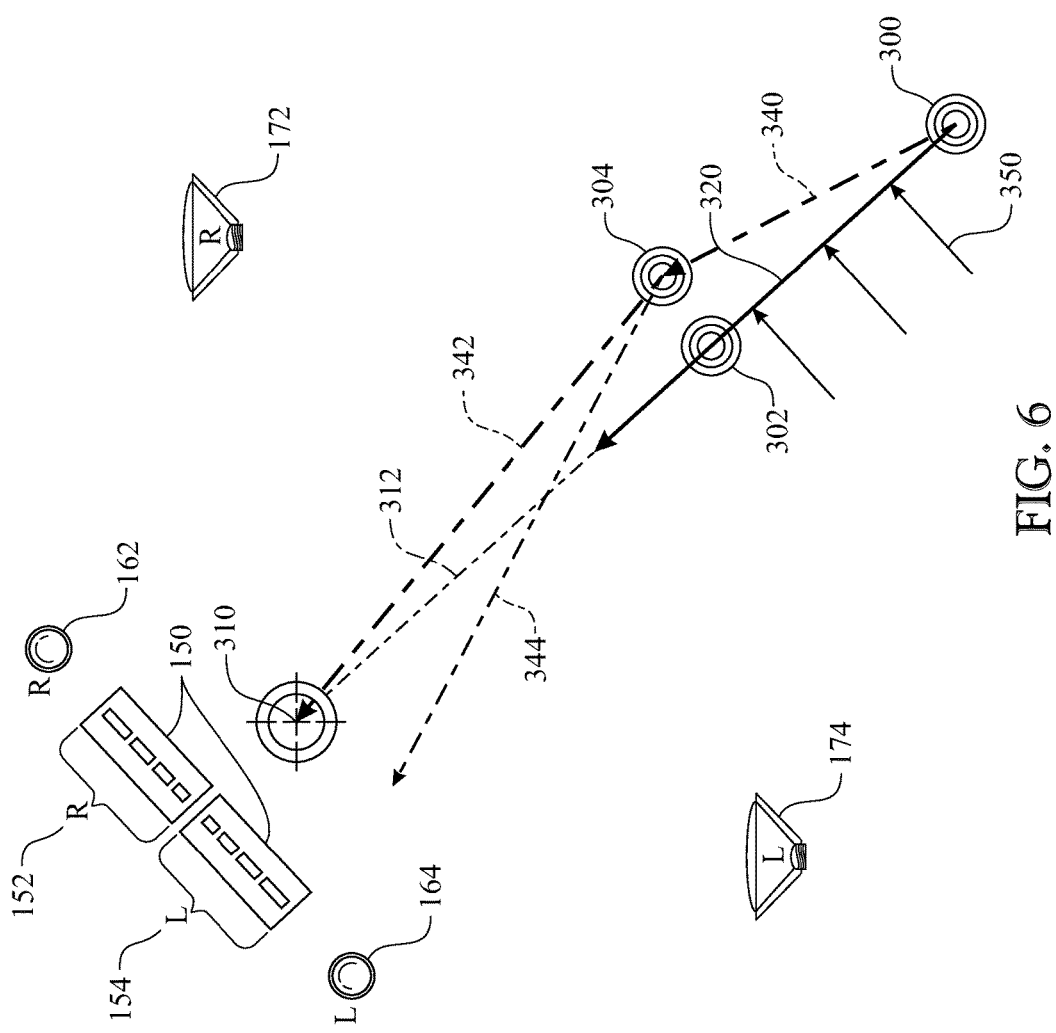
FIG. 6 presents a top view diagram illustrating an operation of an enhanced version of the navigation guidance system.

The user would activate the user input component to notify the navigation guidance system 100 when the user approaches and passes a waypoint 310 (FIGS. 4 and 6). As the user approaches and passes the waypoint 310, the user would activate the waypoint confirmation entry element (the user input component 142, 144, 146). The activated waypoint confirmation entry element provides a signal to the controller circuit 114. This would inform the navigation guidance system 100 that the user has traveled to the current target waypoint 310 and to reset the status and navigation to restart at the current user location waypoint with a heading towards the next target waypoint. The waypoint confirmation entry element can be activated in a manner respective to the selected user input component 142, 144, 146. For example, a button of the right tactile user input element 142 or left tactile user input element 144 would be depressed. A pneumatic interface of the pneumatic user input device 146 would be either blown into or compressed to generate a pneumatic force.

The navigation guidance system 100 includes one or more user notification components. The user notification can be provided using visual indicators 150, 162, 164, audible indicators 172, 174, tactile indicators (not shown), or any other suitable indicator. It is noted that the user notification indicators can be one or more of the above-identified options. For example, in one version, the navigation guidance system 100 can include a pair of visual indicators 162, 164. In a second version, the navigation guidance system 100 can include a pair of audible indicators 172, 174. In a third version, the navigation guidance system 100 can include a pair of visual indicators 162, 164 and a pair of audible indicators 172, 174.

The visual indicators 150, 152, 154, 162, 164, can be a single visual element 150 illuminating a selected color of multiple available colors (such as green for starboard, red for port, white for along current path), a pair of visual elements 152, 154, 162, 164 which would illuminate in accordance to the specific deviation of travel from the programmed path, or any other suitable visual indicator. The visual indicator can be a single illuminating device, such as a Light Emitting Diode (LED) or a series of LED's. The single LED can be a single color LED or a multi-colored LED, capable of emitting any of a variety of colors based upon a desired output. For example, the multi-colored LED can emit a green light, a red light, a white light, an amber light, or any other color deemed suitable to communicate a status to the user. The series of LED's can be used to express an intensity level to convey a degree of deviation from the programmed travel direction to the user. The series of LED's can present a single color or a series of colors to aid in conveying the status to the user.

An optional ambient light sensor 158 can be integrated into the navigation guidance system 100 to adjust an intensity of output lighting from the visual indicators 150, 152, 154, 162, 164. The ambient light sensor 158 senses the intensity of ambient lighting and would provide the information to the controller circuit 114. The controller circuit 114 would include instructions (software) to consider the intensity of ambient lighting and adjust the intensity of output lighting from the visual indicators 150, 152, 154, 162, 164 accordingly. By reducing the intensity of the emitted light, the navigation guidance system 100 would conserve power.

Similarly, the audible indicators 172, 174 can be a single audible element that would emit directions to the user, a pair of audible elements 172, 174 which would emit an audible signal from one of the pair of audible elements 172, 174 in accordance to the specific deviation of travel from the programmed path, or any other suitable audible indicator. When employing the pair of audible elements 172, 174, each audible element 172, 174 would be located proximate the respective ear of the user. It is understood that the audible elements 172, 174 can be rigidly mounted to the carrying device or be flexibly mounted to the carrying device, such as in a form factor of an ear bud for adapting to the user's ear. The audible element 172, 174 can emit an audible signal at a varying intensity level to convey a degree of deviation from the programmed travel direction to the user.

The navigation guidance printed circuit assembly (PCA) 110 can optionally include a global navigation satellite system (GNSS) receiving circuit 138, wherein the optional global navigation satellite system (GNSS) receiving circuit 138 would be employed to compensate for conditions where the user is subjected to a cross or lateral current, where the impact on the actual direction of travel might not be identified by the electronic compass 130. The global navigation satellite system (GNSS) receiving circuit 138 would be in signal communication with a global navigation satellite system (GNSS) receiving circuit antenna 139.

One advantage to having the electronic compass 130 separate from the global navigation satellite system (GNSS) receiving circuit 138 that can return a compass heading is that the electronic compass 130 can be used almost immediately at startup to store a compass heading, where the global navigation satellite system (GNSS) receiving circuit 138 is rather slow to respond when initial satellite acquisition is occurring and in addition, the compass heading calculated by the global navigation satellite system (GNSS) receiving circuit 138 requires that travel occur for a period of time from the initial location. The global navigation satellite system (GNSS) receiving circuit 138 is "slow to start" and must have motion.

The navigation guidance goggles 200 would include all of the components of commonly available goggles, including a pair of goggle lenses 214 carried by navigation guidance printed circuit assembly (PCA) 110, a goggle bridge member 212 extending between each goggle frame 210, a goggle body 218 extending rearward from each goggle frame 210 providing a gas entrapping containment section, and a goggle strap 220 attached to a distal or outer end of each goggle frame 210 by an electro-mechanical connector 122. Orientation of the navigation guidance goggles 200 can be reference by a goggle exterior 202 and a goggle interior 204.

The goggle frame 210 is commonly fabricated of a substantially rigid material, such as plastic. The goggle body 218 is commonly fabricated of a pliant material, such as rubber, silicone, and the like. The goggle body 218 is shaped, defining a goggle seal contact surface 219. The goggle seal contact surface 219 is shaped and fabricated of a plaint material to conform to contours of a user's face. When worn, the goggle body 218 defines an air chamber that enables the user to see through the goggle lens 214. The main components of the body portion (the goggle frame 210, the goggle bridge member 212, the goggle lens 214, and the goggle body 218) can be manufactured and assembled using one or more over molding steps. The goggle strap 220 can be fabricated from a sheet of rubber, silicone, or other material with similar elastic properties. The goggle strap 220 is coupled to the body portion of the goggle strap 220 by a strap connector 222. It is understood that the strap connector 222 can define a fixed length for the goggle strap 220 or the electro-mechanical connector 122 can enable adjustability for the goggle strap 220. In one embodiment, the strap connector 222 can include one or more slots where a free end of the goggle strap 220 is inserted therethrough. In another embodiment, the goggle strap 220 can be pinned to the goggle frame 210 and/or goggle body 218 using a mechanical assembly component. It is understood that the goggle strap 220 can include an adjustable feature such as a dense hook and loop tape provided to secure free ends of two segments to one another, a buckle or other adjustment component, and the like.

The navigation guidance system 100 is integrated into the various elements of the body portion and/or the goggle strap 220. The navigation guidance system 100 would be fabricated using a small navigation guidance printed circuit board (PCB) 112, a flexible circuit board 112, a molded 112, or any other suitable circuit assembly supporting component. Each of the visual indicators 152, 154 can be integrated into each respective goggle lens 214 as shown or, alternatively, the peripheral visual indicators 162, 164 can be peripherally mounted to the body portion (at a location proximate a peripheral edge of the associated controller circuit 114) by a peripheral visual alert support element, similar to the peripheral visual alert support element 590 shown in FIG. 9, or alternatively, the visual indicators 162, 164 can be distally mounted to the body portion by a visual alert distal mounting assembly, similar to the visual alert distal mounting assembly 890 shown in FIGS. 14 and 15. The visual alert distal mounting assembly 890 includes a distal visual alert locating arm 892, which could be a rigid element retaining each respective distal visual indicator 162, 164 at a fixed position or having plastic bending properties, enabling the user to adjust a position of each respective distal visual indicator 162, 164. The design and location of the visual indicators 150, 152, 154, 162, 164 would consider any impact to the user's focus, thus optimizing a system that would not distract the user's vision during use.

Each audible indicator 172, 174 would be mounted to the goggle strap 220 in a region proximate a user's ear, as best shown in FIG. 3. Each audible indicator 172, 174 would be carried by an audible alert assembly 240. The audible alert assembly 240 includes an audible alert locating arm 242. The audible alert locating arm 242 is fixed or adjustably assembled to the goggle strap 220. The adjustable capability enables the user to optimize the location of each audible indicator 172, 174 respective the user's ear. An audible alert support element 244 is carried by a distal end of the audible alert locating arm 242. Each audible indicator 172, 174 would be carried by the respective audible alert support element 244. Each audible alert support element 244 can include any suitable assembly configuration for assembly of the audible alert support element 244 to the goggle strap 220. Each audible alert support element 244 can be a rigid element retaining each respective audible indicator 172, 174 at a fixed position or having plastic bending properties, enabling the user to adjust a position of each respective audible indicator 172, 174 to optimize the location respective the user's ear.

Each user input element 142, 144 would be carried by the goggles at a location determined by the designer. In the exemplary embodiment, each user input element 142, 144 is installed at an outer or distal end of the associated goggle frame 210 as best shown in FIG. 2. It is understood that the user input elements 142, 144 can be provided as a separate element, wherein the user can secure each user input element 142, 144 to their clothing, their hands, or any other appropriate location.

Signal communication between the visual indicators 150, 152, 154, 162, 164; the audible indicators 172, 174, the user input elements 142, 144 and the controller circuit 114 would be provided by any suitable electrical element, such as wires, a ribbon cable, a wiring harness, one or more connectors, and any other necessary elements. The suitable electrical elements could be molded within the components of the goggles, inserted into a channel or other receptacle formed within the components of the goggles, or assembled to the goggles using any other suitable configuration.

The pneumatic user input device 146 would include a pneumatic interface between the pneumatic user input device 146 and the controller circuit 114 (or other acceptable input. The pneumatic interface would be flexible enabling the user to locate the pneumatic user input device 146 proximate their mouth. The user can either mount the pneumatic user input device 146 onto the navigation guidance goggles 200, carry the pneumatic user input device 146 within their mouth, or retain the pneumatic user input device 146 in any other accessible manner for pneumatic operation.

It is understood that any or all of the individual electronic components can be integrated into one or more integrated circuits, such as a custom chip, a specialized chip set, and the like.

Figure 5:
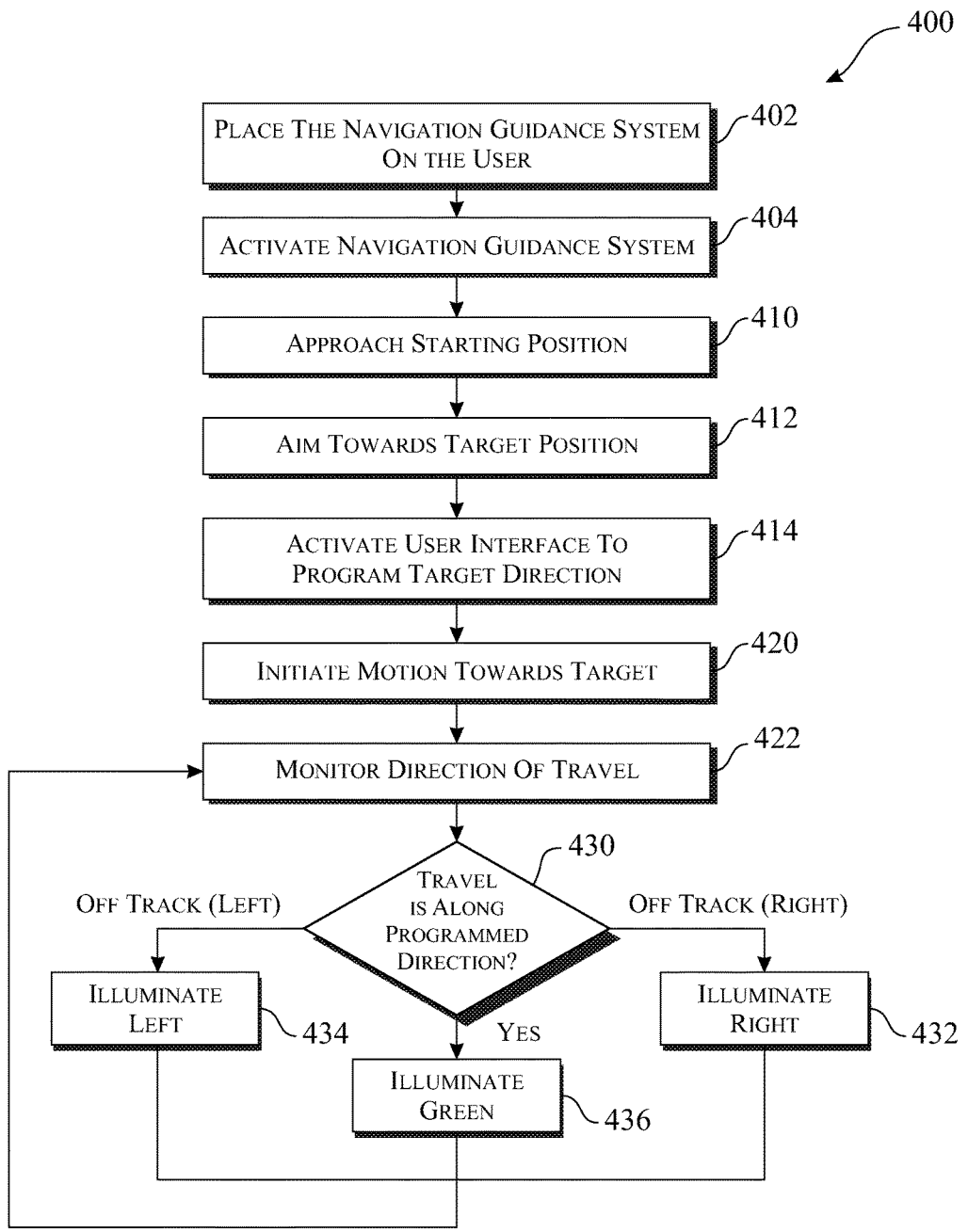
FIG. 5 presents a flow diagram illustrating an operation process describing steps for using the navigation guidance system.

Operation of the navigation guidance system 100 is presented in a schematic block diagram presented in FIG. 4 and an associated navigation guidance operation flow diagram 400 presented in FIG. 5. The exemplary embodiment described herein references the navigation guidance goggles 200 in association with the operation of the navigation guidance system 100. It is understood that the navigation guidance goggles 200 is exemplary for descriptive purposes and that the operation of the navigation guidance system 100 would be applied to any suitable carrying device. The user would obtain the navigation guidance goggles 200 and properly locate the navigation guidance goggles 200 on their face.

A course is mapped with a series of waypoints. A first waypoint is referred to as a starting position. Inflection points or turning locations can be referred to as intermediary waypoints. The end position can be referred to as the finishing position or finish line. A graphical representation presented in FIG. 4 demonstrates the applicability of the navigation guidance system 100 between a starting position 300 and a target destination 310. The desired or optimal end result is where the user travels along an optimal travel path 312 extending between the starting position 300 and the target destination 310.

The user would obtain the navigation guidance system 100 as integrated into an appropriate form factor. In the exemplary embodiment, the user would obtain the navigation guidance goggles 200. Prior to initiating use of the navigation guidance goggles 200, a starboard/right travel path acceptable (slight) deviation demarcation angle 331, a starboard/right travel path severe deviation demarcation angle 332, a port/left travel path acceptable (slight) deviation demarcation angle 334, and a port/left travel path severe deviation demarcation angle 335 would be established. Any travel between the starboard/right travel path acceptable (slight) deviation demarcation angle 331 and the port/left travel path acceptable (slight) deviation demarcation angle 334 would be considered as being acceptable. Any travel (exemplified as a starboard/right minor (slight) deviating travel path 322) between the starboard/right travel path acceptable (slight) deviation demarcation angle 331 and the starboard/right travel path severe deviation demarcation angle 332 would be considered as a minor starboard deviation. Any travel (exemplified as a port/left minor (slight) deviating travel path 325) between the port/left travel path acceptable (slight) deviation demarcation angle 334 and the port/left travel path severe deviation demarcation angle 335 would be considered as a minor port deviation.

Any travel (exemplified as a starboard/right major (severe) deviating travel path 323) outside of the starboard/right travel path severe deviation demarcation angle 332 would be considered as a major starboard deviation. Any travel (exemplified as a port/left major (severe) deviating travel path 326) outside of the port/left travel path severe deviation demarcation angle 335 would be considered as a major (severe) port deviation. The controller circuit 114 would direct an indication to the user that would be associated with the degree of deviation from the optimal travel path 312.

The following table describes one exemplary navigation indicator that could be used to aid in conveying navigation information to the user.

TABLE 1

Travel Path Determination

| Actual Travel Path Consideration | Boundary Reference | | Travel Path | Indicator | |
|---|---|---|---|---|---|
| | Left Boundary | Right Boundary | | Left | Right |
| On Course (Right) | 312 | 331 | 320 | Green | Green |
| On Course (Left) | 334 | 312 | 320 | Green | Green |
| Slight Deviation (Right) | 331 | 332 | 322 | Off | Yellow |
| Major Deviation (Right) | 332 | 333 | 323 | Off | Red |
| Excessive Deviation (Right) | 333 | Open | 324 | Flash Red | Flash Red |
| Slight Deviation (Left) | 334 | 335 | 325 | Yellow | Off |
| Major Deviation (Left) | 335 | 336 | 326 | Red | Off |
| Excessive Deviation (Left) | 336 | Open | 327 | Flash Red | Flash Red |

Although the exemplary embodiment utilizes a pair of angles extending from each of a port and a starboard side of the optimal travel path 312, it is understood that the system can include any number of defining angles to provide a scale to aid the user in understanding the degree of offset in travel. It is also understood that the system can use a multiplier to determine the degree of offset. For example, if the system were programmed to increment the angular offset by 2 degrees, the system would raise the indication level for every 2 degrees of offset. The system would indicate a first level of offset to the user when the direction of travel (actual compass heading) is two (2) degrees off from the optimal travel path 312. The system would indicate a second level of offset to the user when the direction of travel (actual compass heading) is four (4) degrees off from the optimal travel path 312. The system would indicate a third level of offset to the user when the direction of travel (actual compass heading) is six (6) degrees off from the optimal travel path 312, and so forth.

The user would appropriately place the navigation guidance goggles 200 onto their head (step 402). The user activates the navigation guidance system 100 in accordance with the designed activation process of the navigation guidance system 100 (step 404). The user approaches a starting position (step 410). When the user reaches the starting position, the position can be referred to as a starting position 300. The direct line extending between the starting position 300 and the target destination 310 is identified as an optimal travel path 312. The user aims the navigation guidance system 100 towards a target position, referenced as a target destination 310 in the exemplary embodiment, or alternatively understood as being along the optimal travel path 312 (step 412). While the navigation guidance system 100 is aimed towards the target position (target destination 310), or along the optimal travel path 312, the user activates one or more of the user input devices 142, 144, 146 (step 414). The signal from the user input devices 142, 144, 146 is received by the controller circuit 114. The user initiates motion towards the target destination 310 (step 420). The navigation guidance system 100 initiates monitoring for motion along a direction using the electronic compass 130 (step 422). The navigation guidance system 100 employs the electronic compass 130 to determine the direction of travel of the navigation guidance goggles 200, as worn by the user. The electronic compass 130 conveys the magnetic heading of the navigation guidance goggles 200 to the controller circuit 114. The controller circuit 114 would determine if the actual direction of travel is the optimal direction of travel 320 or if the system should convey a requirement for a course correction to the user (decision step 430). Additionally, the system can identify a degree of correction based upon the magnitude of the deviation in the actual direction of travel from the optimal travel path 312 (decision step 430). The optimal direction of travel 320 would be when the user is traveling along the optimal travel path 312. It is understood that the system should consider a tolerance. A starboard/right travel path acceptable (slight) deviation demarcation angle 331 is established along a starboard (right) side of the optimal travel path 312. A port/left travel path acceptable (slight) deviation demarcation angle 334 is established along a port (left) side of the optimal travel path 312. The region extending between the starboard/right travel path acceptable (slight) deviation demarcation angle 331 and the port/left travel path acceptable (slight) deviation demarcation angle 334 is considered as being acceptable for travel. The angles associated with the starboard/right travel path acceptable (slight) deviation demarcation angle 331 and the port/left travel path acceptable (slight) deviation demarcation angle 334 can be established based upon the distance between the starting position 300 and the target destination 310. A shorter distance between the starting position 300 and the target destination 310 would enable a greater tolerance compared to a longer distance between the starting position 300 and the target destination 310.

In a single or simplified solution, the navigation guidance system 100 would activate a specific identifier when the navigation guidance system 100 determines that the user (or the navigation guidance goggles 200) is heading along:

(A) an optimal travel path 312, wherein the optimal travel path 312 would be between the starboard/right travel path acceptable (slight) deviation demarcation angle 331 and the port/left travel path acceptable (slight) deviation demarcation angle 334;

(B) a minor deviating travel path 322, 325, wherein the minor deviating travel path 322, 325 would be between the starboard/right travel path acceptable (slight) deviation demarcation angle 331 and the starboard/right travel path severe deviation demarcation angle 332 or between the port/left travel path acceptable (slight) deviation demarcation angle 334 and the port/left travel path severe deviation demarcation angle 335, respectively;

(C) a major (severe) deviating travel path 323, 326, wherein the major (severe) deviating travel path 323, 326 would be outside of the starboard/right travel path severe deviation demarcation angle 332 or the port/left travel path severe deviation demarcation angle 335, respectively;

(D) if excessive deviation demarcation angles 333, 336 were defined by the system, a major (severe) deviating travel path 323, 326, wherein the major (severe) deviating travel path 323, 326 would be between the starboard/right travel path severe deviation demarcation angle 332 and the starboard/right travel path excessive deviation demarcation angle 333 or between the port/left travel path severe deviation demarcation angle 335 and the port/left travel path excessive deviation demarcation angle 336, respectively; or (E) if excessive deviation demarcation angles 333, 336 were defined by the system, an excessive deviating travel path 324, 327, wherein the excessive deviating travel path 324, 327 would be outside of the starboard/right travel path excessive deviation demarcation angle 333 or the port/left travel path excessive deviation demarcation angle 336, respectively;

When the navigation guidance system 100 determines that the actual travel path is along either a starboard/right minor (slight) deviating travel path 322 or a port/left minor (slight) deviating travel path 325 (step 430), the navigation guidance system 100 activates the associated indicator to alert the user accordingly (steps 432, 434, 436). For example, when the navigation guidance system 100 determines that the path of travel is considered to be outside of the starboard/right travel path severe deviation demarcation angle 332 (identified as the starboard/right minor (slight) deviating travel path 322) by the tolerance angle, the system would illuminate the right distal visual alert component 162 and, if audible alert components 172, 174 are included, emit an audible alert from the right audible alert component 172 (step 432). In a second example, when the navigation guidance system 100 determines that the path of travel is determined to be considered to be outside of the port/left travel path severe deviation demarcation angle 335 (identified as the port/left major (severe) deviating travel path 326) by the tolerance angle, the system would illuminate the left distal visual alert component 164 and, if audible alert components 172, 174 are included, emit an audible alert from the left audible alert component 174 (step 434). In a third example, if the navigation guidance system 100 determines the path of travel is within the acceptable tolerance from the optimal travel path 312 (between the starboard/right travel path acceptable (slight) deviation demarcation angle 331 and the port/left travel path acceptable (slight) deviation demarcation angle 334), the navigation guidance system 100 can either leave the visual alerts in a non-illuminating condition; illuminate either one or both of the visual alerting components 162, 164 at a color, such as green, or illuminating both visual alerting components 162, 164 in any color (step 436).

The system can optionally include a travel path excessive deviation demarcation angle 333, 336, wherein the system would identify when the path would be considered as an excessive deviating travel path 324, 327. When the system determines that the path of travel is one of a starboard/right excessive deviating travel path 324 or a port/left excessive deviating travel path 327, the system could indicate that the user would need to reset the compass heading for the course. One exemplary visual indication requesting the user reset the compass heading for the course could be flashing a red color in either or both of the visual indicators 162, 164. Similarly, one exemplary audible indication requesting the user reset the compass heading for the course could be to emit a specific tone, a series of tones, or an audible directive in either or both of the audible indicators 172, 174.

It is understood that the navigation guidance system 100 can be programmed to include multiple starboard/right minor (slight) deviating travel path 322 and port/left minor (slight) deviating travel path 325, preferably identified as a number of angles. Each of the multiple starboard/right minor (slight) deviating travel path 322 and port/left minor (slight) deviating travel path 325 would direct a presence of a different an intensity level from the output indicators; either the visual indicators 150, 152, 154, 162, 164; the audible indicators 172, 174, tactile indicators (not shown), or any other indicating component. When the navigation guidance system 100 determines that the actual travel path is along either a starboard/right minor (slight) deviating travel path 322 or the port/left minor (slight) deviating travel path 325, the navigation guidance system 100 determines the magnitude of deviation and activates the associated indicator to alert the user based upon the magnitude of the deviation from the optimal travel path 312. For example, when the navigation guidance system 100 determines that the path of travel is considered to be along a starboard/right minor (slight) deviating travel path 322 between a second and a third magnitude level away from the optimal travel path 312, the system would illuminate the right distal visual alert component 162 at a second intensity level and, if audible alert components 172, 174 are included, emit an audible alert from the right audible alert component 172. It is understood that the intensity level can be presented as a brightness, a rate of flashing, and the like when using one or more LED'S. When using the varying level visual alert system 150, or more specifically, the right visual alert LED series 252 and left visual alert LED series 154, the system could illuminate an associated number of LED'S of a series of LED'S utilized for the visual alert LED series 152, 154. In yet another solution, the distal visual alert component 162, 164 can be colored to identify the severity or magnitude of deviation from the optimal travel path 312. For example, the distal visual alert component 162, 164 would remain unlit or emitting a green light when the direction of travel is between the optimal travel path 312 and the first magnitude angle, thus having an actual travel path that is considered to be within a standard tolerance. The associated distal visual alert component 162, 164 would convert to emit a yellow or amber colored light when the direction of travel is determined to be between the first magnitude angle and the second magnitude angle. The associated distal visual alert component 162, 164 would convert to emit a red colored light when the direction of travel is determined to be greater than the third magnitude angle.

In the above-described embodiment, the optimal travel path 312 is programmed when the user reaches each waypoint. Each waypoint then becomes the new starting position 300 and the process is repeated.

In an alternative embodiment, a direction between each pair of waypoints along a route defined by a course can be preprogrammed into the navigation guidance system 100. The user would convey to the navigation guidance system 100 that the user has reached the target destination 310 by activating one or more of the user input components 142, 144, 146. In a more complex solution, the user can enter a route defining a course by entering coordinates of each waypoint. This can be accomplished by any number of methods, including entering a compass heading and a distance between waypoints, a global positioning system coordinate for each waypoint, a geographic representation of the course, or any other representation. With this knowledge, the system can employ the motion sensing device 132 to determine a rate of travel in conjunction with the compass heading. The combination of the rate of travel and the compass heading defines a velocity. The velocity can be used to determine a current position of the user along the optimal travel path 312. The system would operate in accordance with the above-described processes while the user is traveling between the starting position 300 and the target destination 310. Once the user reaches the target destination 310, the user would activate the user input component 142, 144, 146 to advance the system to utilize the next leg of the course to monitor the travel path of the user. This would continue until the user reaches an end waypoint of the course.

Figure 7:
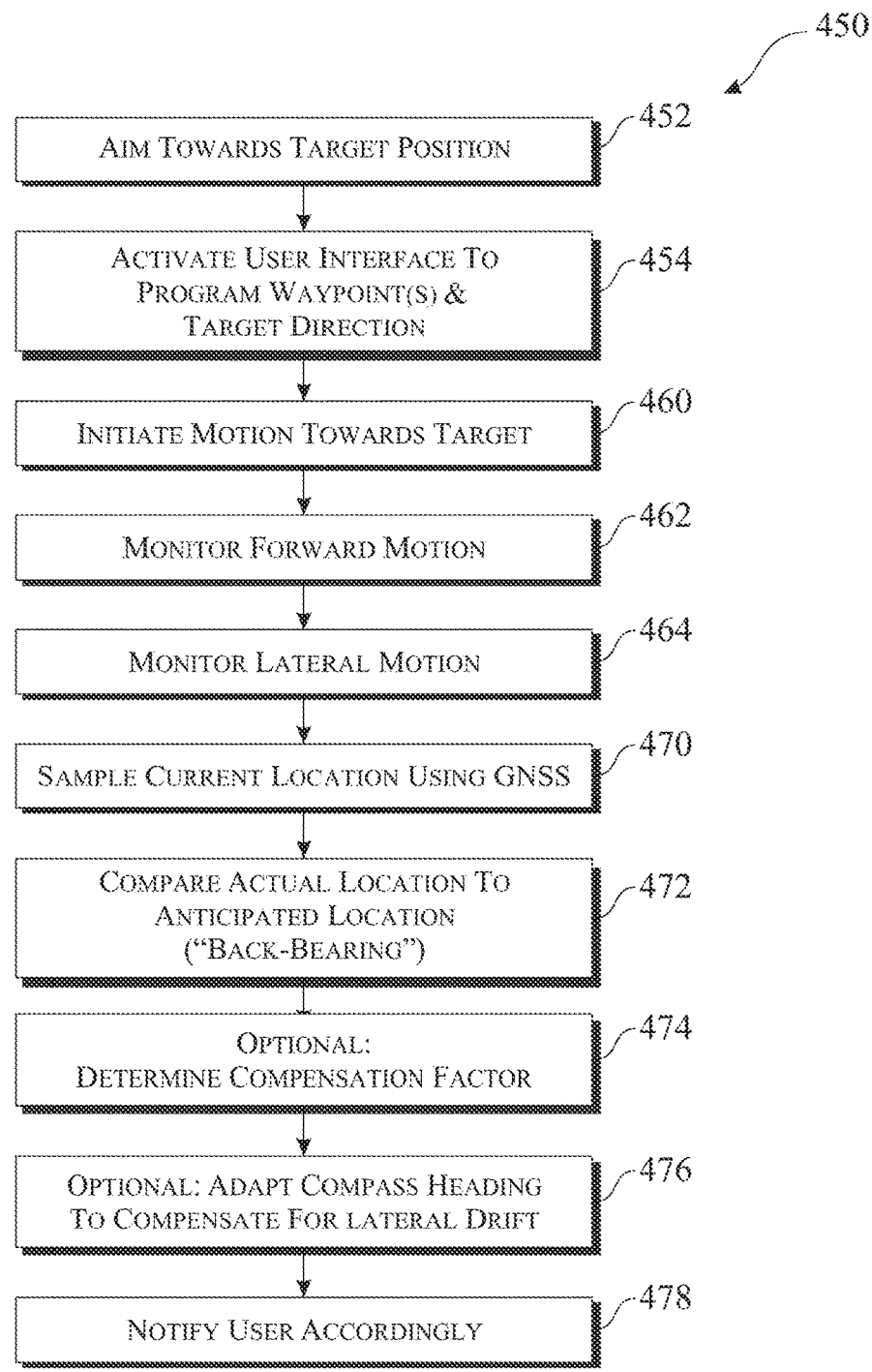
FIG. 7 presents a flow diagram illustrating an enhanced operation process describing steps for using the enhanced navigation guidance system.

The use of the navigation guidance system 100 while engaging in swimming, boating, or other activities has a potential to be affected by a lateral current 350 of water and/or wind. This scenario is depicted in a schematic block diagram presented in FIG. 6 and compensated in accordance with a drift compensating navigation guidance operation flow diagram 450 presented in FIG. 7. The drift compensating navigation guidance operation flow diagram 450 initiates in a manner similar to the steps presented in the navigation guidance operation flow diagram 400 described above. A portion of the steps are included herein, including a step of aiming the navigation guidance system 100 towards the target destination 310 (step 452). This can be accomplished by simply facing the target position (target destination 310). While the navigation guidance system 100 is aimed towards the target position (target destination 310), or along the optimal travel path 312, the user activates one or more of the user input devices 142, 144, 146 (step 454). The signal from the user input devices 142, 144, 146 is received by the controller circuit 114. The user initiates motion towards the target destination 310 (step 460). The navigation guidance system 100 initiates monitoring for motion along a direction using the electronic compass 130. In a perfect environment, the swimmer's actual path of travel would follow the swimmer's direction they are swimming towards. Since the swimmer is commonly swimming in a natural body of water, there is a high probability that the swimmer will be subjected to a lateral current flow 350, a lateral wind, and/or any other lateral force of nature, which would offset the swimmer's path.

The swimmer's direction of travel, as determined by the electronic compass 130, is compromised by the effects of a lateral current 350. The schematic block diagram presents an example where the swimmer's direction of travel is identified as an optimal actual travel path 320. A lateral current 350 can impact an actual direction of travel of a swimmer, even when the swimmer is determined to be swimming along the optimal compass heading 312. The navigation guidance system 100 determines that the swimmer is traveling along the optimal actual travel path 320 and understands the swimmer's location to be an assumed travel position 302 based upon information provided by the electronic compass 130. The lateral current 350 causes a shift in the actual direction of travel to an actual resulting travel path 340 or placing the swimmer at an actual travel position 304. It is noted by the schematic block diagram that the actual travel position 304 is offset from the assumed travel position 302. The electronic compass 130 would be unable to identify the shift from the assumed direction of travel 320 to the actual direction of travel 340. This discrepancy would impact the efficiency of the swimmer in traversing a course from the initial position 300 to the target destination 310. The motion sensing device 132 would monitor for forward motion of the navigation guidance system 100 (step 462) as well as lateral motion of the navigation guidance system 100 (step 464). The navigation guidance system 100 can include operational steps or circuitry to periodically (or continuously) employ the optional global navigation satellite system (GNSS) receiving circuit 138 to determine an actual current position 304 of the navigation guidance system 100 (or user) (step 470). The controller circuit 114 would utilize sample location information determined by the optional global navigation satellite system (GNSS) receiving circuit 138 and compare the actual travel position 304 to a predicted or assumed travel position 302 (step 472). The comparison can be used in any of a variety of steps to inform the user that the user is being subjected to the lateral current 350. In another process, the/global navigation satellite system (GNSS) receiving circuit 138 could compare a reverse compass heading with information obtained by the optional global navigation satellite system (GNSS) receiving circuit 138 to determine if the user that the user is being subjected to the lateral current 350 and subsequently inform the user that the user is being subjected to the lateral current 350. In either scenario, the navigation guidance system 100 would inform the user that the user has deviated from a straight line of navigation and preferably convey a severity of the deviation to the user.

In another solution, the controller circuit 114 could determine and introduce a compensation factor into the navigation process. The controller circuit 114 utilizes the actual travel position 304 and the predicted or assumed travel position 302 to determine a compensation factor to accommodate the lateral drift of the swimmer resulting from the lateral current 350 (optional step 474). The controller circuit 114 would adapt the originally programmed compass heading to include the compensation factor determined by comparing the actual travel position 304 and the predicted or assumed travel position 302 (optional step 476). In one example, the controller circuit 114 can correct the heading and redirect the swimmer to follow a corrected travel heading 342. The corrected travel heading 342 would direct the swimmer towards the target destination 310. Alternatively, the navigation guidance system 100 can include intelligence to determine a probable compensation for the lateral current 350 and subsequently adjust the optimal travel path 312 to an effective corrected travel heading 344. The effective corrected travel heading 344 would include compensation for the lateral current 350, thus directing the swimmer to follow a direction of travel that would, in combination with the lateral current 350, provide the most direct path towards the target destination 310. It is understood that the lateral current 350 can vary along the optimal travel path 312 between the starting position 300 and the target destination 310. Based upon this, the navigation guidance system 100 could continue to employ the optional global navigation satellite system (GNSS) receiving circuit 138 to verify that the compass heading is accurately and optimally directing the swimmer towards the target destination 310. By pulsing the optional global navigation satellite system (GNSS) receiving circuit 138, the navigation guidance system 100 would reduce power consumption. The navigation guidance system 100 can include intelligence to optimize the use of the optional global navigation satellite system (GNSS) receiving circuit 138 to minimize power consumption. This provides a distinct advantage over competing global positioning system (GPS) based solutions.

It is understood that the forward motion and the lateral motion can be utilized in the process of determining the compensation factor. The navigation guidance system 100 would provide navigation guidance to the user in accordance with the updated information, compensating for the lateral drift resulting from the lateral current 350 (step 478). It is understood that the navigation guidance system 100 can inform the user that the direction of travel of the user is affected by the lateral current 350 using any reasonable communication method to convey the impact of the lateral current 350 thereto.

The navigation guidance system 100 can include an optional global navigation satellite system (GNSS) receiving circuit 138 to identify when the lateral current 350 is present. The global navigation satellite system (GNSS) receiving circuit 138 is distinguished from a standard global positioning system (GPS) wherein the standard global positioning system (GPS) provides complete navigation and the navigation guidance system 100 simply utilizes the actual location obtained from the global navigation satellite system (GNSS) receiving circuit 138 to determine a "backheading" or validation. The optional global navigation satellite system (GNSS) receiving circuit 138 would identify the effective travel heading 340. The optimal actual travel path 320 would be determined by the electronic compass 130. The controller circuit 114 can utilize the information to determine an offset and introduce a compensation factor when determining if the actual direction of travel is: following the optimal travel path 312; offset towards a right of the optimal travel path 312; or offset towards a left of the optimal travel path 312 (decision step 430). Since the optional global navigation satellite system (GNSS) receiving circuit 138 draws a significant amount of power, the controller circuit 114 can recognize and store the compensation factor. The navigation guidance system 100 could include operational instructions to periodically activate the optional global navigation satellite system (GNSS) receiving circuit 138 to validate or update the compensation factor. The combination of the electronic compass 130, the optional global navigation satellite system (GNSS) receiving circuit 138 and the ability to limit the operational time of the optional global navigation satellite system (GNSS) receiving circuit 138 significantly reduces power consumption. The reduced power requirements can minimize the size of the portable power supply 118. The smaller the portable power supply 118, the smaller the size and the lower the weight of the navigation guidance system 100. These are two critical factors when a user is competing in an event where weight and drag are factors that need to be considered.

Figure 8:
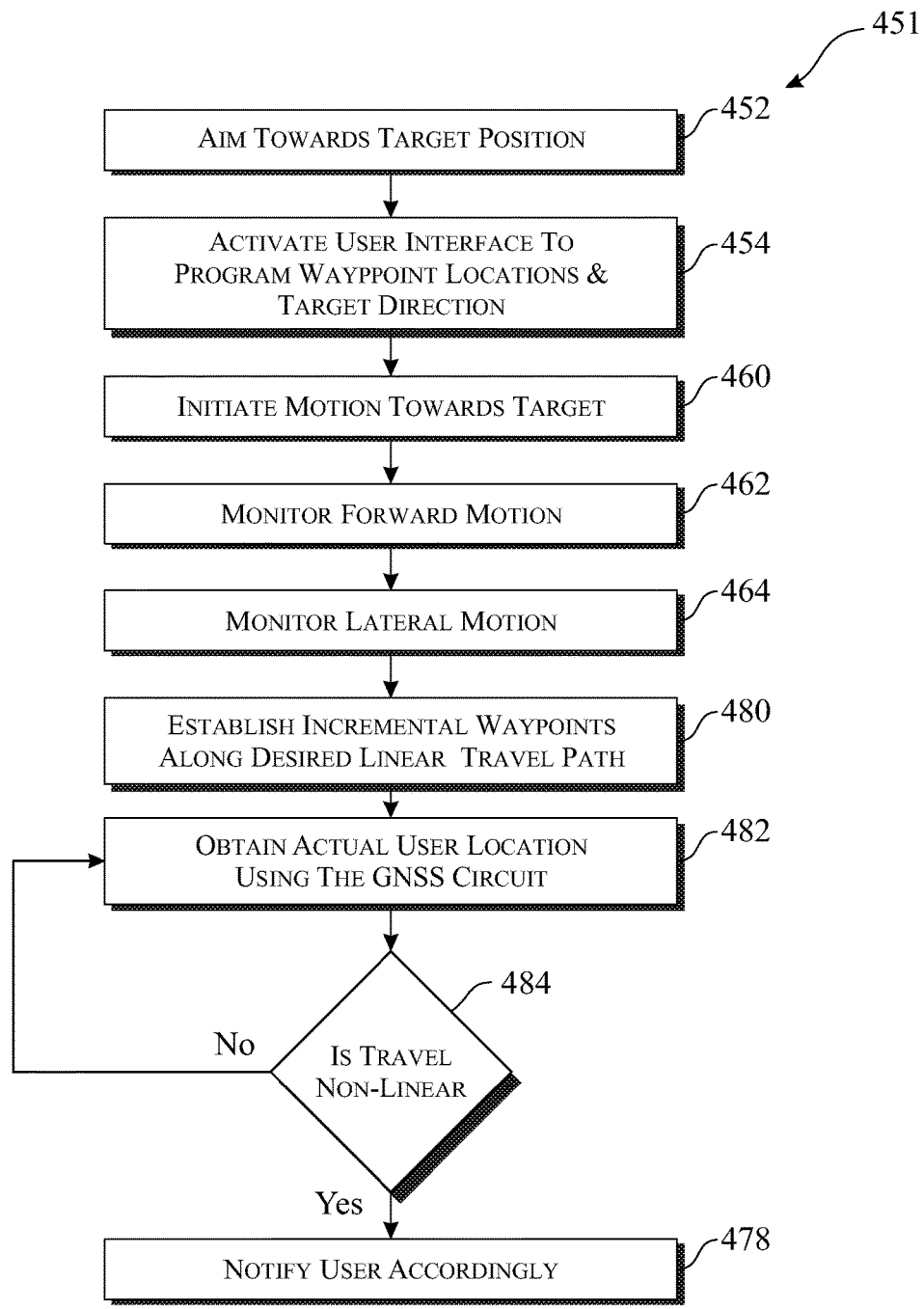
FIG. 8 presents a flow diagram illustrating an alternative enhanced operation process describing steps for using an enhanced navigation guidance system.

An alternate validation process is presented in a drift compensating navigation guidance operation flow diagram 451 as shown in FIG. 8. The drift compensating navigation guidance operation flow diagram 451 is a variant from the drift compensating navigation guidance operation flow diagram 450 previously described. A majority of the steps of the drift compensating navigation guidance operation flow diagram 450 and the drift compensating navigation guidance operation flow diagram 451 are the same, and referenced accordingly. The distinctive steps are as follows:

The navigation guidance system 100 would generate a manageable number of incremental waypoints along a straight line extending between the starting position 300 and the target destination 310 (step 480). The incremental waypoints along the optimal travel path 312 would preferably be equally spaced along the length thereof. The global navigation satellite system (GNSS) receiving circuit 138 would be used to obtain actual travel positions 304 as the user proceeds forward (step 482). Any lateral current flow 350 could cause the user's travel path to be offset, as reflected by the effective travel heading 340. The navigation guidance system 100 compares the obtain actual travel positions 304 with the incremental waypoints along the optimal travel path 312 or the travel path to determine if the travel path, as determined by the electronic compass 130, is affected by any lateral current flow 350 (decision step 484). In a condition where the navigation guidance system 100 determines that the actual travel position 304 is offset from the incremental waypoints along the optimal travel path 312, the navigation guidance system 100 would inform the user accordingly (478).

Essentially, the navigation guidance system 100 monitors the heading/bearing acquired by the electronic compass 130. The navigation guidance system 100 provides feedback if the actual travel path of the user (as determined by the electronic compass 130) deviates from the compass heading associated with the optimal travel path 312. The global navigation satellite system (GNSS) receiving circuit 138 determines the actual travel position 304. The navigation guidance system 100 would also provide feedback to the user when the actual travel position 304 (as determined by the global navigation satellite system (GNSS) receiving circuit 138) differs from the incremental waypoints generated by the navigation guidance system 100. As the user continues to travel forward, the global navigation satellite system (GNSS) receiving circuit 138 would generate additional actual location data points, which could be collected for comparison with the calculated incremental waypoints along the optimal travel path 312. An optional motion sensing device 132 can be integrated into the navigation guidance system 100. The motion sensing device 132 can be a motion sensor, an accelerometer, or the like. The inclusion of the motion sensing device 132 introduces an offering of one or more optional enhancing features. One optional enhancing feature made available by the inclusion of the motion detecting device 132 is a method for calibrating the electronic compass 130, more specifically to establish magnetic north. The user would rotate the device carrying the navigation guidance system 100 around in a circle for a period of time, enabling the navigation guidance system 100 to calibrate the electronic compass 130.

The motion sensing device 132 can be employed for other functions, such as acquisition of motion data associated with of movement of at least one of: a user's head, a navigation guidance system, and the like. The system can use motion data collected by the motion sensing device 132 to predict the movement and position of the navigation guidance system 100 in order to operate the electronics in a power saving mode when the position of the navigation guidance system 100 is not optimal, then switch to a full power mode when the navigation guidance system 100 is anticipated to be in the most optimal position for the acquisition of sensor data. This information can also be used to create intervals of the lower power mode and the high power mode as a cycle of the movements is learned, The system can be adapted to export or provide real time data to an external device. Access to the real time data can be accomplished through a serial communication bus, such as a Universal Serial Bus (USB) interface; a wireless communication circuit, such as Wi-Fi, Bluetooth, and the like; or any other suitable signal communication link. The real time data can be acquired by any suitable computing device, including a desktop computer, a portable computing device, a portable computing tablet, a Smartphone, a wrist worn portable computing device or a Smart watch, and the like.

The system can be adapted to record an actual travel path and an associated time of each data point. The stored travel history would be accessible for use. Access to the stored travel history can be accomplished in a manner similar to the method for acquiring the real time data presented above, including through a serial communication bus, such as a Universal Serial Bus (USB) interface; a wireless communication circuit, such as Wi-Fi, Bluetooth, and the like; or any other suitable signal communication link. The stored travel history can be acquired by any suitable computing device, including a desktop computer, a portable computing device, a portable computing tablet, a Smartphone, a wrist worn portable computing device or a Smart watch, and the like.

A second optional enhancing feature made available by the inclusion of the motion detecting device 132 is a method for activating and deactivating the navigation guidance system 100. The navigation guidance system 100 can be activated upon detection of a motion of the device carrying the navigation guidance system 100 by the motion detecting device 132. The navigation guidance system 100 can transition into a sleep mode after a predetermined period of time of inactivity.

Another optional enhancing feature made available by the inclusion of the motion detecting device 132, the navigation guidance system 100 can determine and consider a rate or speed of travel. A combination of the motion detecting device 132 and the electronic compass 130 enables the controller circuit 114 to determine a velocity (speed and direction) of the navigation guidance system 100. This introduces an ability to program a digital map of a predetermined course into the navigation guidance system 100 and utilize the electronic programmed map to provide navigational assistance to the user, which will be described in detail at a later point within this Specification.

Another optional enhancing feature made available by the inclusion of the motion detecting device 132, the navigation guidance system 100 can determine and act upon a motion of the user's head. This can be provided to aid in storing a heading, determining a heading, determining a cadence, and the like.

Another optional enhancing feature made available by the inclusion of the motion detecting device 132 is the ability to enable the controller circuit 114 to compensate the magnetic compass values as the result of motions of the user's body or head or any other motions the navigation guidance system 100 may be subjected to during use.

Another optional enhancing feature made available by the inclusion of the motion detecting device 132, when combined with an optional integrated electronic level 134 can be used to determine a cadence and provide feedback respective to the cadence to the user. The same feature can be accomplished using a multi-axis accelerometer, a gyroscope, a multi-axis gyroscope, or any other device capable of acquiring the same data.

The optional integrated electronic level 134 can introduce an ability to compensate for motions of the user's head or any unwarranted motions the navigation guidance system 100 may be subjected to during use.

Figure 9:
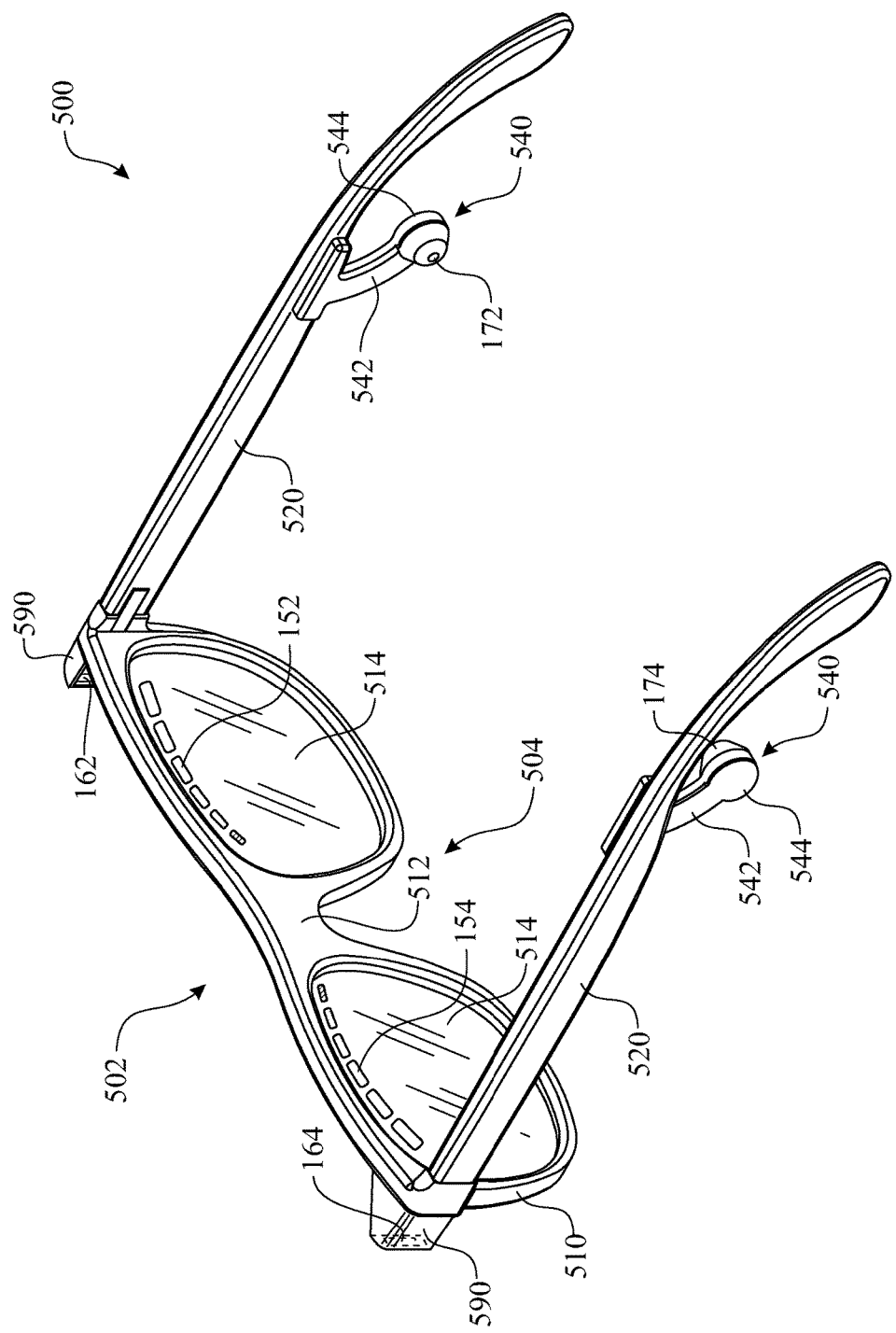
FIG. 9 presents an isometric rear view of a second exemplary implementation of the navigation guidance system, wherein the navigation guidance system is integrated into a pair of eye glasses.
Figure 14:
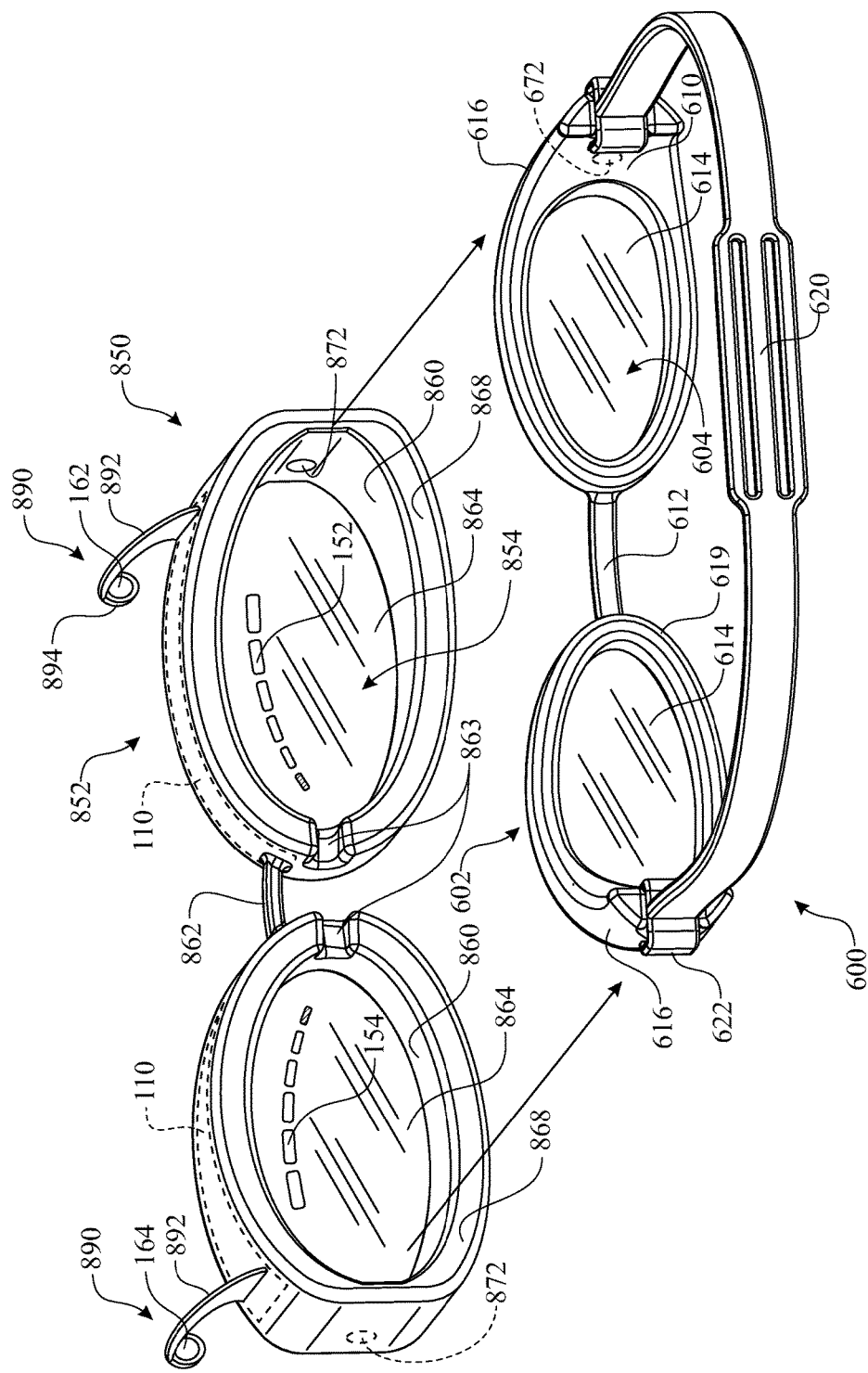
FIG. 14 presents an isometric rear exploded assembly view of an alternative goggles cover for use in conjunction with the pair of goggles.
Figure 15:
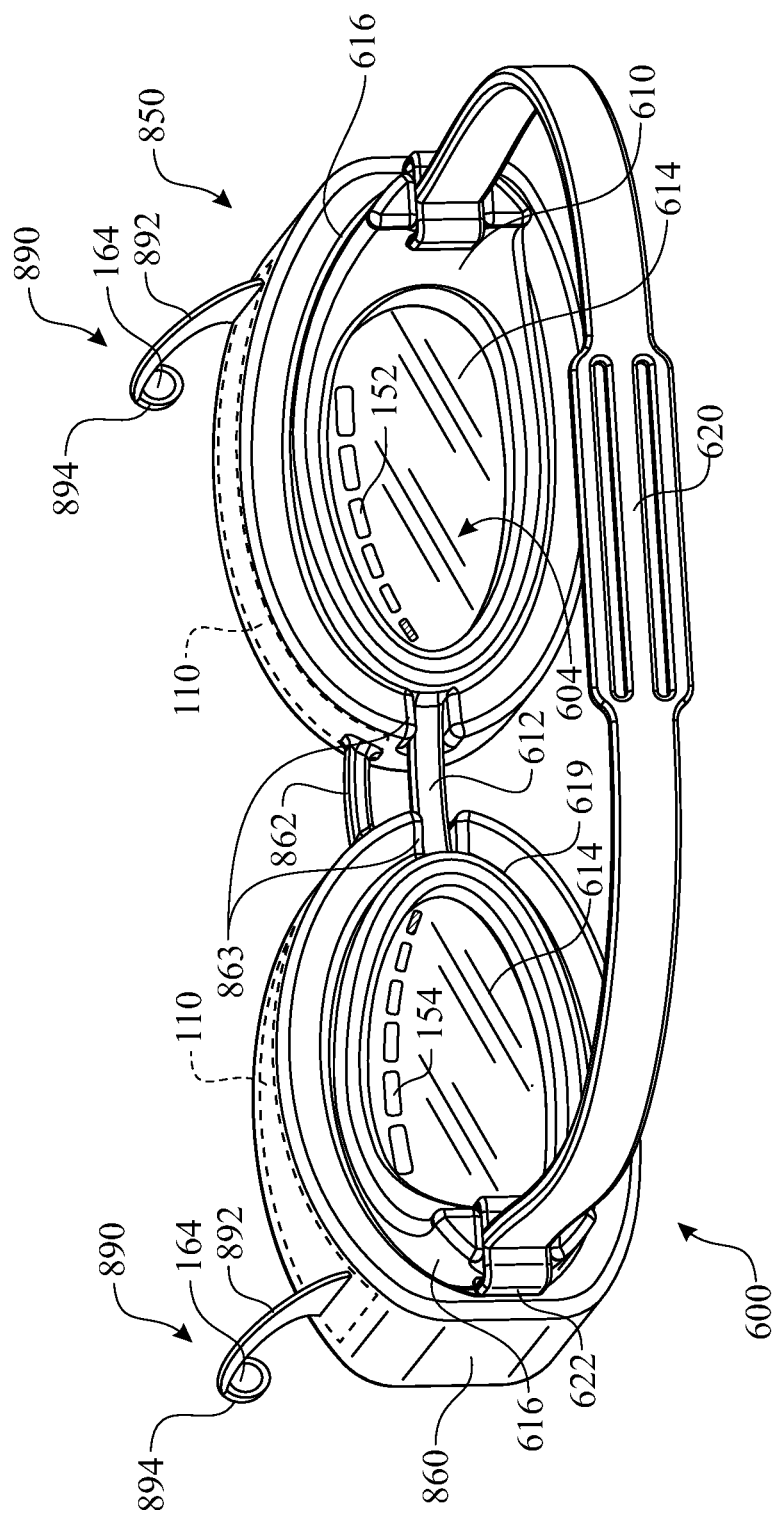
FIG. 15 presents an isometric rear exploded assembled view of the alternative goggles cover introduced in FIG. 14, wherein the alternative goggles cover is assembled onto the pair of goggles.
Figure 18:
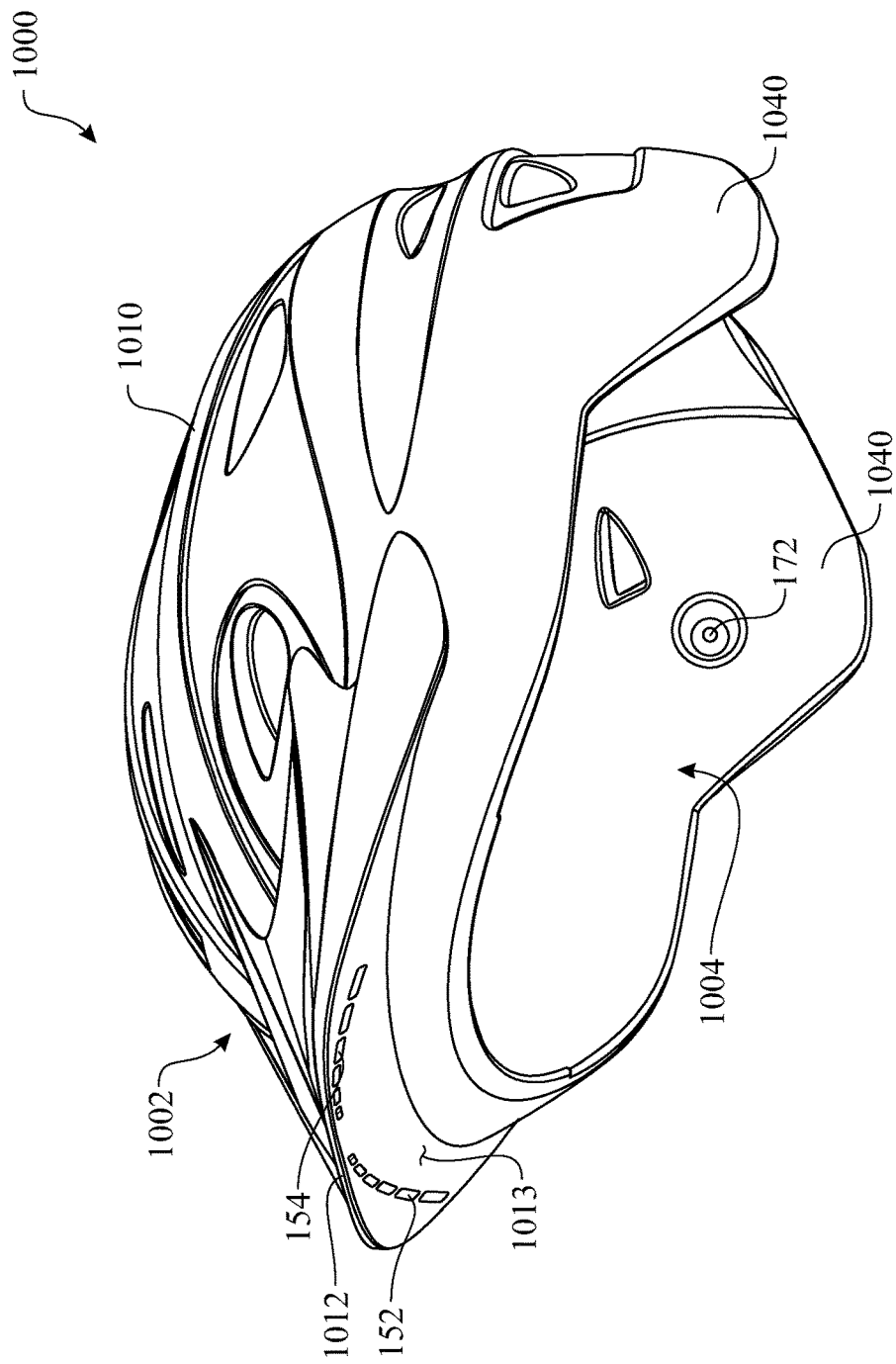
FIG. 18 presents an isometric lower side view of a fourth exemplary implementation of the navigation guidance system, wherein the navigation system is integrated into a helmet.

Although the above is directed towards a swimming event, it is understood that the navigation guidance system 100 can be adapted for other applications. Other carrying devices or integrated solutions can include a navigation guidance glasses 500, as illustrated in FIG. 9, a first navigation guidance goggles cover configuration 650 that is adapted to be temporarily or permanently coupled to a pair of goggles 600, as illustrated in FIGS. 10 through 13, a second navigation guidance goggles cover configuration 750 that is adapted to be temporarily or permanently coupled to a goggles 600, as illustrated in FIGS. 14 and 15, a navigation guidance helmet 800, as illustrated in FIG. 18, or any other suitable device, such as a dive mask for snorkeling, diving, etc., and the like.

The navigation guidance glasses 500 are similar to the navigation guidance goggles 200. Like features of the navigation guidance goggles 200 and the navigation guidance glasses 500 are numbered the same except preceded by the numeral '5'. Orientation of the navigation guidance glasses 500 can be referenced by a glasses exterior 502 and a glasses interior 504. The navigation guidance glasses 500 are manufactured by pivotally assembling a pair of glasses temple 520 to a glasses frame 510. The glasses frame 510 supports a pair of glasses lens 514. A glasses bridge member 512 is a section of the glasses frame 510 extending between each section of the glasses frame 510 surrounding the respective glasses lens 514. The navigation guidance glasses 500 can include one or more alert components, such as a lens mounted visual alert 152, 154, a distal visual alert 162, 164, an audible alert component 172, 174, a tactile alert component, such as a vibratory device (an off balanced motor, a piezoelectric vibrator, a pancake vibrating motor, and the like), a pressure device, and the like, (not shown) or any other suitable alert component.

The lens mounted visual alert 152, 154 would be integrated into each respective glasses lens 514 or within the glasses frame 510 in a peripheral region about the lens 514.

Each of the distal visual alert components 162, 164 is carried by a peripheral visual alert support element 590. Each peripheral visual alert support element 590 is located somewhere about a peripheral edge of the associated glasses lens 514. In the exemplary embodiment, the peripheral visual alert support element 590 is located proximate an outer distal region of the glasses lens 514. The peripheral visual alert support element 590 can be designed having any suitable shape. The exemplary design includes a shade about the associated distal visual alert component 162, 164 to direct the emitted light towards the user, using care not to aim the light directly into the user's eyes. The peripheral visual alert support element 590 can act as a shade located behind the associated distal visual alert component 162, 164 to only direct the emitted light towards the user. The navigation guidance printed circuit assembly (PCA) 110 can be inserted into an enclosure mounted upon either glasses temple 520. Alternatively the navigation guidance printed circuit assembly (PCA) 110 can be partially or completely molded within the glasses frame 510.

The audible alert components 172, 174 could be carried by an audible alert assembly 540, wherein the audible alert assembly 540 would be similar to the audible alert assembly 240 of the navigation guidance goggles 200. Like features of the audible alert assembly 540 and the audible alert assembly 240 are numbered the same except preceded by the numeral '5'. Each audible alert assembly 540 could be rigidly assembled to the glasses temple 520 or positionably (such as slideable connector, clip based connector, or any other repositionable coupling assembly configuration) assembled to the glasses temple 520, enabling optimal repositioning of the right audible alert component 172 respective to the user's ears.

Operation of the navigation guidance system 100 within the navigation guidance glasses 500 would be as described above. The user input device (input device 142, 144, 146 of FIG. 1) would be integrated into the navigation guidance glasses 500 in any suitable arrangement as described above, including a mechanically operated switch, a pneumatically operated switch, and the like.

The navigation guidance system 100 can be integrated into a cover or other accessory that can be used in conjunction with a commercially available item, such as a navigation guidance goggles cover 650 for use with a pair of goggles 600, as illustrated in FIGS. 10 through 15. The goggles 600 are representative of any suitable navigation system supporting product. The goggles 600 include the non-navigation components of the navigation guidance goggles 200. Like features of the navigation guidance goggles 200 and the goggles 600 are numbered the same except preceded by the numeral '6'. It can be understood by those skilled in the art that the navigation guidance goggles cover 650 can also be designed for use with goggles 600 that are customized or specifically designed for use therewith.

Figure 12:
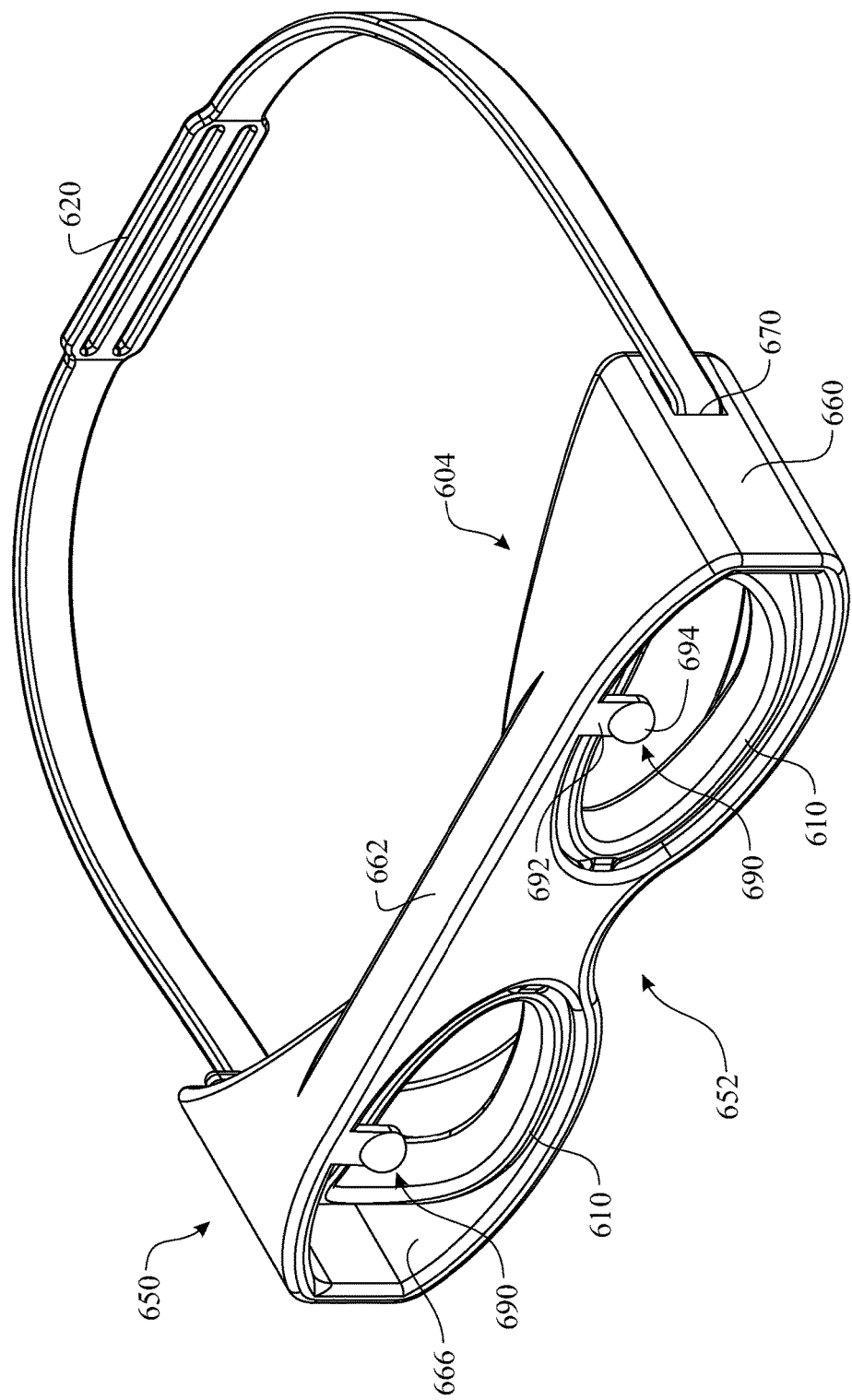
FIG. 12 presents an isometric front assembled view of the goggles cover introduced in FIG. 10, wherein the goggles cover is assembled onto the pair of goggles.

In the exemplary embodiment, the navigation guidance goggles cover 650 is adapted to be temporarily or permanently assembled to the goggles 600. The navigation guidance goggles cover 650 would be shaped to minimize any impact to the view of the user when attached to the goggles 600. Orientation of the goggles 600 can be referenced by a goggles exterior 602 and a goggles interior 604. Similarly, orientation of the navigation guidance goggles cover 650 can be referenced by a goggles cover exterior 652 and a goggles cover interior 654. The navigation guidance system 100 is integrated into the navigation guidance goggles cover 650. The navigation guidance printed circuit assembly (PCA) 110 (preferably assembled using a flex-circuit) can be over molded and encapsulated within a goggles cover frame 660 of the navigation guidance goggles cover 650. In the exemplary embodiment, the goggles cover frame 660 defines a pair of viewing ports passing therethrough. Each viewing port would be sized to circumscribe the respective goggles contact surface 619. A goggles cover bridge member 662 extends between each of the goggles cover frame 660 segments of the navigation guidance goggles cover 650. The goggles cover bridge member 662 can be of any suitable shape, preferably designed to incorporate and support at least a portion of the navigation guidance printed circuit assembly (PCA) 110. A goggles body receptacle 666 extends rearward from the goggles cover frame 660 for receiving and retaining assembly with a goggles body 616 of the goggles 600. The goggles body receptacle 666 can be of any suitable shape to engage with the goggles body 616 of the goggles 600. The navigation guidance goggles cover 650 can optionally/alternatively include a strap passageway 670 formed through each sidewall of the goggles cover frame 660. Each strap passageway 670 would be located to receive the goggles strap 620. The goggles strap 620 would be inserted through the strap passageway 670 and subsequently attached to the goggles body 616 by the strap connector 622. Alternatively, the goggles strap 620 can be provided in two sections, the sections coupled to one another by a coupling element, such as a buckle, connector, and the like. The goggles body receptacle 666 is preferably fabricated of a pliant material, such as silicone, rubber, or any other suitable material with elastic properties. The elastic properties enable adaptation of the goggles body receptacle 666 to contour to the shape of the goggles body 616. The navigation guidance goggles cover 650 introduces one exemplary configuration supporting visual alert components: a right visual alert LED series 152 and a left visual alert LED series 154. Each of the visual alerts 152, 154 are supported within a respective visual alert distal mounting assembly 690. Details of the exemplary visual alert distal mounting assembly 690 are best shown in FIG. 12. Each visual alert distal mounting assembly 690 includes a visual alert support element 694 supported by a visual alert locating arm 692 extending downward from a central upper region of the goggles cover frame 660. The visual alert distal mounting assembly 690 can be integrated into the goggles cover frame 660 and manufactured during a single molding step. Each visual alert 152, 154 is carried by the respective visual alert support element 694. The visual alert 152, 154 can be embedded within the visual alert support element 694, overmolded within the visual alert support element 694, inserted within a cavity formed within the visual alert support element 694, and the like. It is understood that the visual alert distal mounting assembly 690 can be of any reasonable shape, either including or excluding the visual alert locating arm 692. Additionally, the visual alert distal mounting assembly 690 can be located at any reasonable position around a peripheral edge of the viewing aperture of the goggles lens frame 610.

The user input device (input device 142, 144, 146 of FIG. 1) would be integrated into the navigation guidance goggles cover 650 in any suitable arrangement as described above, including a mechanically operated switch, a pneumatically operated switch, and the like.

In preparation for use, the navigation guidance goggles cover 650 would be assembled to the goggles 600 by seating each goggles body 616 within each respective goggles body receptacle 666. The goggles strap 620 would be inserted through each strap passageway 670, when appropriate. The visual aids 162, 164 would be visible to the user through the goggles lens 614 of the goggles 600. The navigation guidance goggles cover 650 can be configured locating each visual aid 162, 164 proximate or distant from the goggles lens 614, wherein the location would be determined by the designer.

Figure 10:
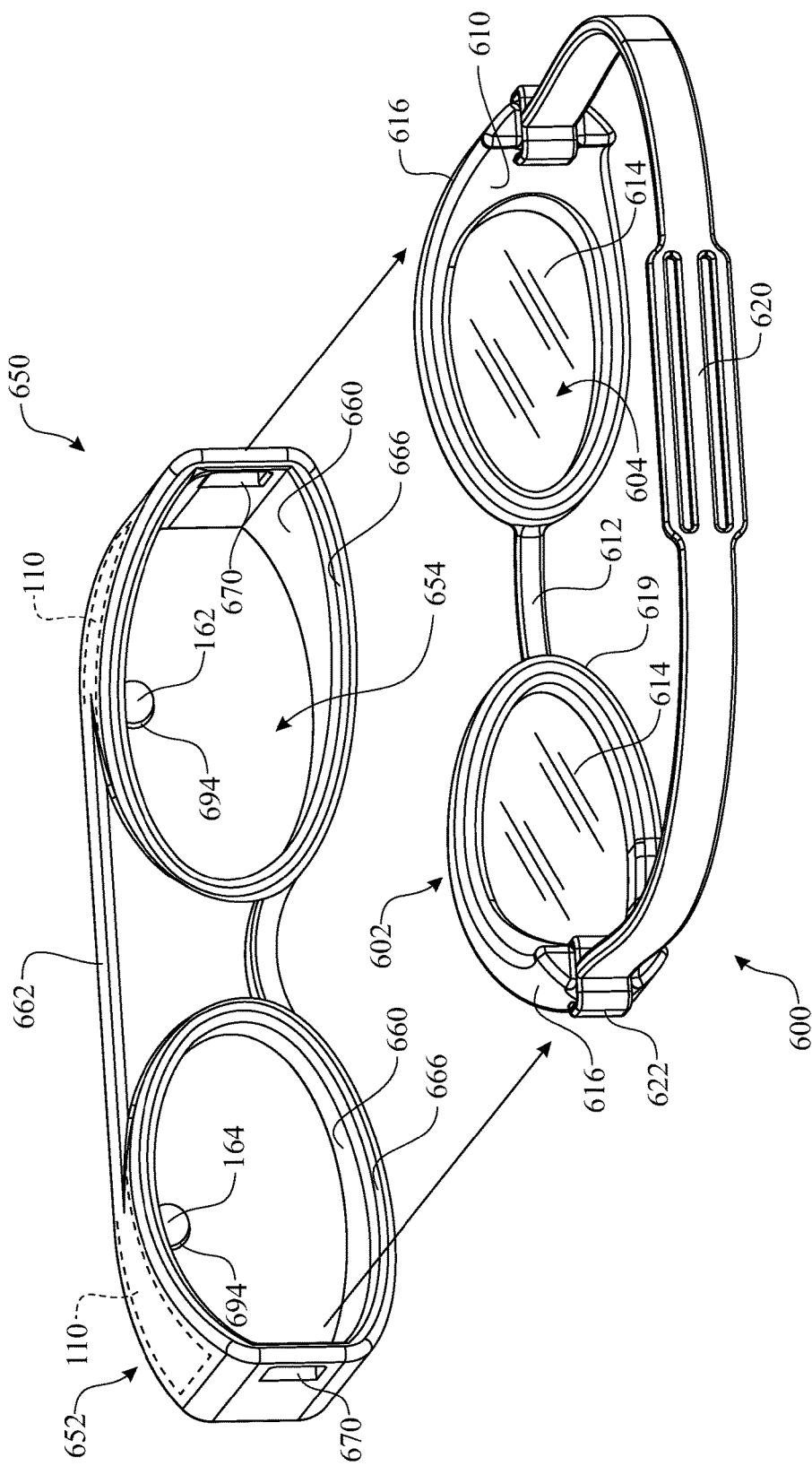
FIG. 10 presents an isometric rear exploded assembly view of the third exemplary implementation of the navigation guidance system wherein the navigation guidance system is integrated into a goggles cover, which is assembled onto the pair of goggles for use.
Figure 11:
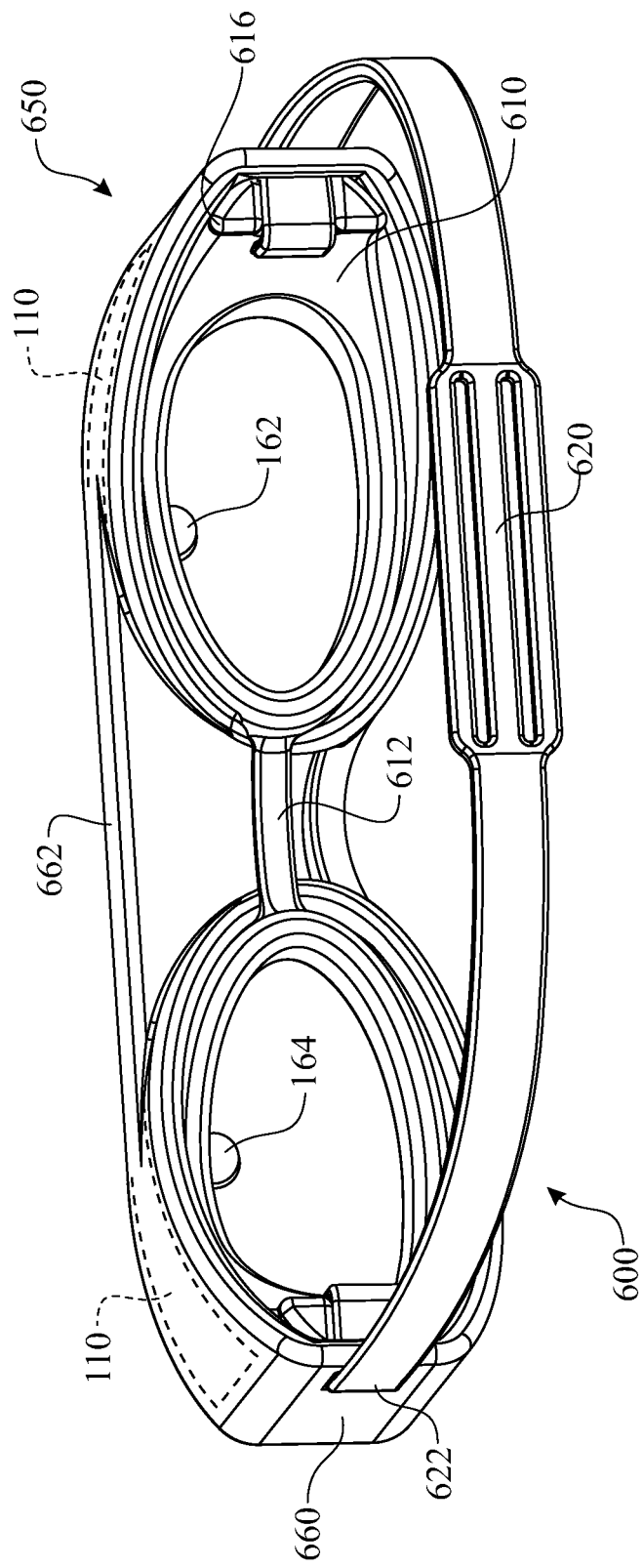
FIG. 11 presents an isometric rear assembled view of the goggles cover introduced in FIG. 10, wherein the goggles cover is assembled onto the pair of goggles.
Figure 13:
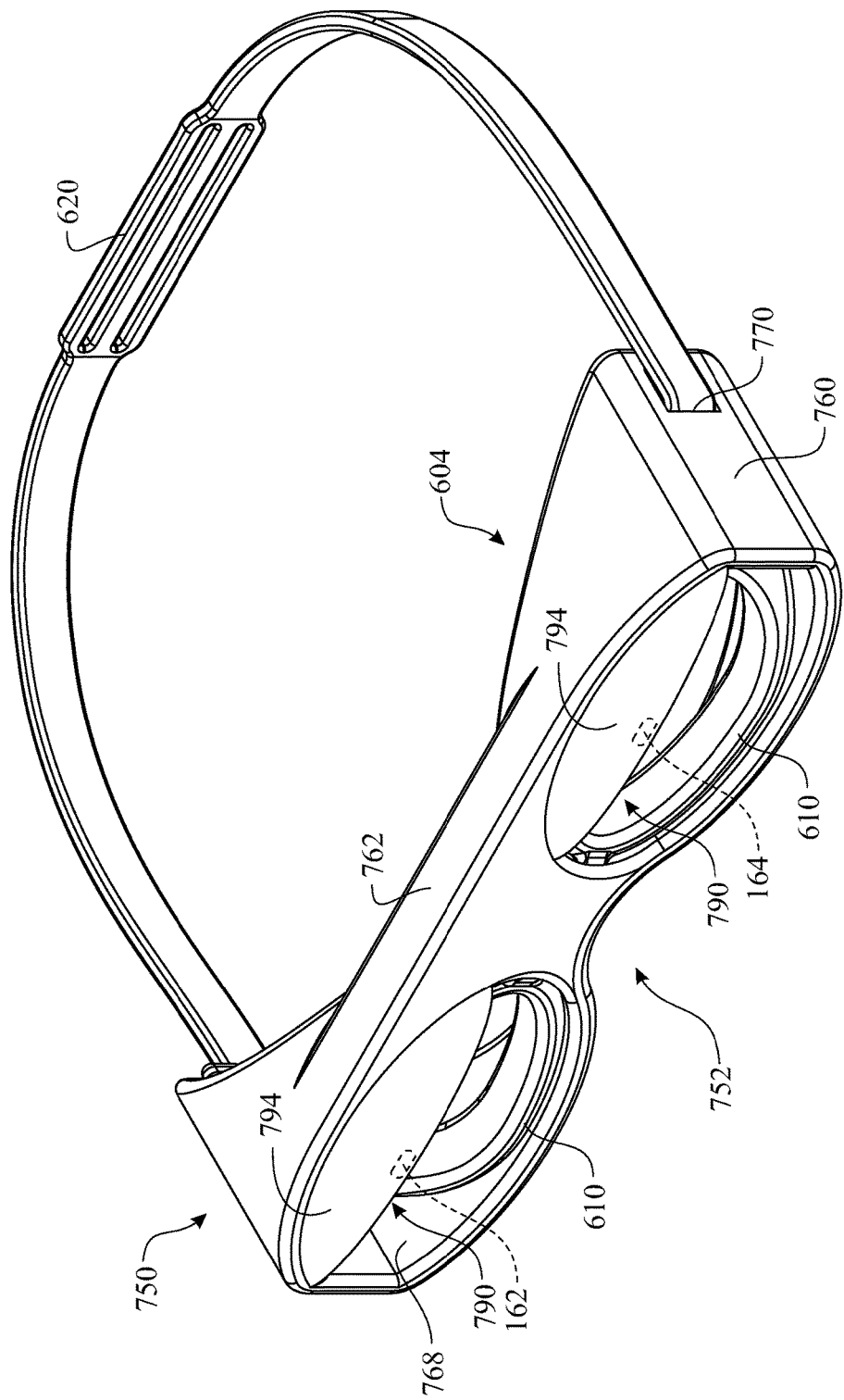
FIG. 13 presents an isometric front assembled view of a variant of the goggles cover introduced in FIG. 10, wherein the variant introduces a modified visual indicator carrier.

A variant of the navigation guidance goggles cover 650 presented in FIGS. 10 through 12 is introduced in FIG. 13 and referred to as a navigation guidance goggles cover 750. Like features of the navigation guidance goggles cover 750 and the navigation guidance goggles cover 650 are numbered the same except preceded by the numeral '7'. The distinguishing feature of the navigation guidance goggles cover 750 is a configuration of the visual alert distal mounting assembly 790. The visual alert distal mounting assembly 790 includes a visual alert support element 794 extending across each upper edge of the viewing port of each respective goggles cover frame 760. Each visual aid 162, 164 would be carried by the respective visual alert support element 794. Each visual aid 162, 164 can be embedded within the visual alert support element 794, overmolded within the visual alert support element 794, inserted within a cavity formed within the visual alert support element 794, and the like. It is understood that the visual alert support element 794 can include a feature allowing the user to position each visual aid 162, 164 laterally to a desired position that provides the optimal guidance while minimizing any distractions. The lateral adjusting feature can be a pocket, a sliding interface, or any other suitable design known by those skilled in the art. The visual alert support element 794 can be shaped to locate the visual aid along a plane of the opening (forward edge) of the goggles cover frame 760 or extending forward of the forward edge of the goggles cover frame 760 (as illustrated). This configuration also or alternatively provides the manufacturer with an ability to locate the visual aid 162, 164 at any suitable area of the visual alert support element 794. More specifically, this would enable a change in the location of the visual aid 162, 164 without a tooling change or with a nominal tooling change. The visual alert support element 794 would preferably be manufactured of an opaque material, wherein light emitted by the visual aids 162, 164 would only be visible to the user.

The user input device (input device 142, 144, 146 of FIG. 1) would be integrated into the navigation guidance goggles cover 750 in any suitable arrangement as described above, including a mechanically operated switch, a pneumatically operated switch, and the like.

The navigation guidance goggles cover 650, 750 provides one exemplary embodiment of the present invention. It is understood that the design and features of the navigation guidance goggles cover 650, 750 can be modified or altered to employ any known design for attachment to the goggles 600. The present invention should not be limited by the design of the navigation guidance goggles cover 650, 750. Various exemplary features are introduced in an alternative embodiment of the navigation guidance goggles cover 650, 750, referred to as a navigation guidance goggles cover 850 and illustrated in FIGS. 14 and 15. Like features of the navigation guidance goggles cover 850 and the navigation guidance goggles cover 650, 750 are numbered the same except preceded by the numeral '8'.

The navigation guidance goggles cover 850 can optionally include a pair of goggles cover lenses 864. In a version including the pair of goggles cover lenses 864, the goggles body receptacle 868 would preferably be sized and shaped to receive and create a watertight seal with at least one of a goggles lens frame 610 and a goggles body 616. The navigation guidance goggles cover 850 can include any suitable feature for securing the navigation guidance goggles cover 850 and the goggles 600 to one another. For example, the navigation guidance goggles cover 850 can include a pair of bridge member coupling features 863. The pair of bridge member coupling features 863 can be formed within a region proximate a goggles cover bridge member 862 for receiving and coupling to a goggles bridge member 612 of the goggles 600, as shown in FIG. 15. In another example, the navigation guidance goggles cover 850 can include any suitable cover integrated mechanical coupler 872 which would releaseably engage with a mating goggle integrated mechanical coupler 672 for securing the navigation guidance goggles cover 850 and the goggles 600 to one another. The suitable cover integrated mechanical coupler 872 and the mating goggle integrated mechanical coupler 672 could be a snap configuration, a magnetic attracting configuration, a hook and loop configuration, and the like. Any reasonable number of mechanical coupling elements could be integrated into the navigation guidance goggles cover 850 and the goggles 600 at any suitable location or locations for securing the navigation guidance goggles cover 850 and the goggles 600 with one another. If the magnetic attracting configuration were integrated into the navigation guidance goggles cover 850, considerations would be made to ensure that the magnetic attracting configuration does not impact the operation of the electronic compass 130. This can include magnetic strength or other associated properties, inclusion of a magnetic flux barrier, location of the magnetic attracting configuration elements, and the like.

The exemplary navigation guidance goggles cover 850 includes two alternate variants for visual alert components: a right visual alert LED series 152 and a left visual alert LED series 154, wherein each visual alert component 152, 154 would be integrated into associated goggles cover lens 864 or a visual alert distal mounting assembly 890 locating a visual alert support element 894 spatially forward of a forward surface of the goggles cover frame 860. Each visual alert distal mounting assembly 890 includes a visual alert locating arm 892 for spatially the visual alert support element 894 from the goggles cover frame 860. Each visual alert locating arm 892 can be fabricated of a rigid material, an elastic material, or a plastically deformable material. A rigid material retains the visual alert support element 894 in a fixed position. The elastic visual alert support element 894 enables flexure to reduce potential damage to the visual alert locating arm 892. The plastically deformable visual alert support element 894 enables the user to reshape the visual alert locating arm 892, adjusting the position of the right distal visual alert component 162. The visual alert locating arm 892 can be of any suitable shape, size, or other design characteristic to support the use thereof.

The user input device (input device 142, 144, 146 of FIG. 1) would be integrated into the navigation guidance goggles cover 850 in any suitable arrangement as described above, including a mechanically operated switch, a pneumatically operated switch, and the like.

In use, the navigation guidance goggles cover 850 is placed over the goggles body 616 of the goggles 600. The goggles bridge member 612 is inserted into each bridge member coupling feature 863. Operation of the navigation guidance system 100 within the navigation guidance goggles cover 850, as assembled to the goggles 600, would be as described above.

It is understood that the designs of each of the various embodiments are exemplary, wherein features of one embodiment can be included within another embodiment. For example, the strap passageway 670 of the navigation guidance goggles cover 650 can be integrated into the navigation guidance goggles cover 850.

Figure 16:
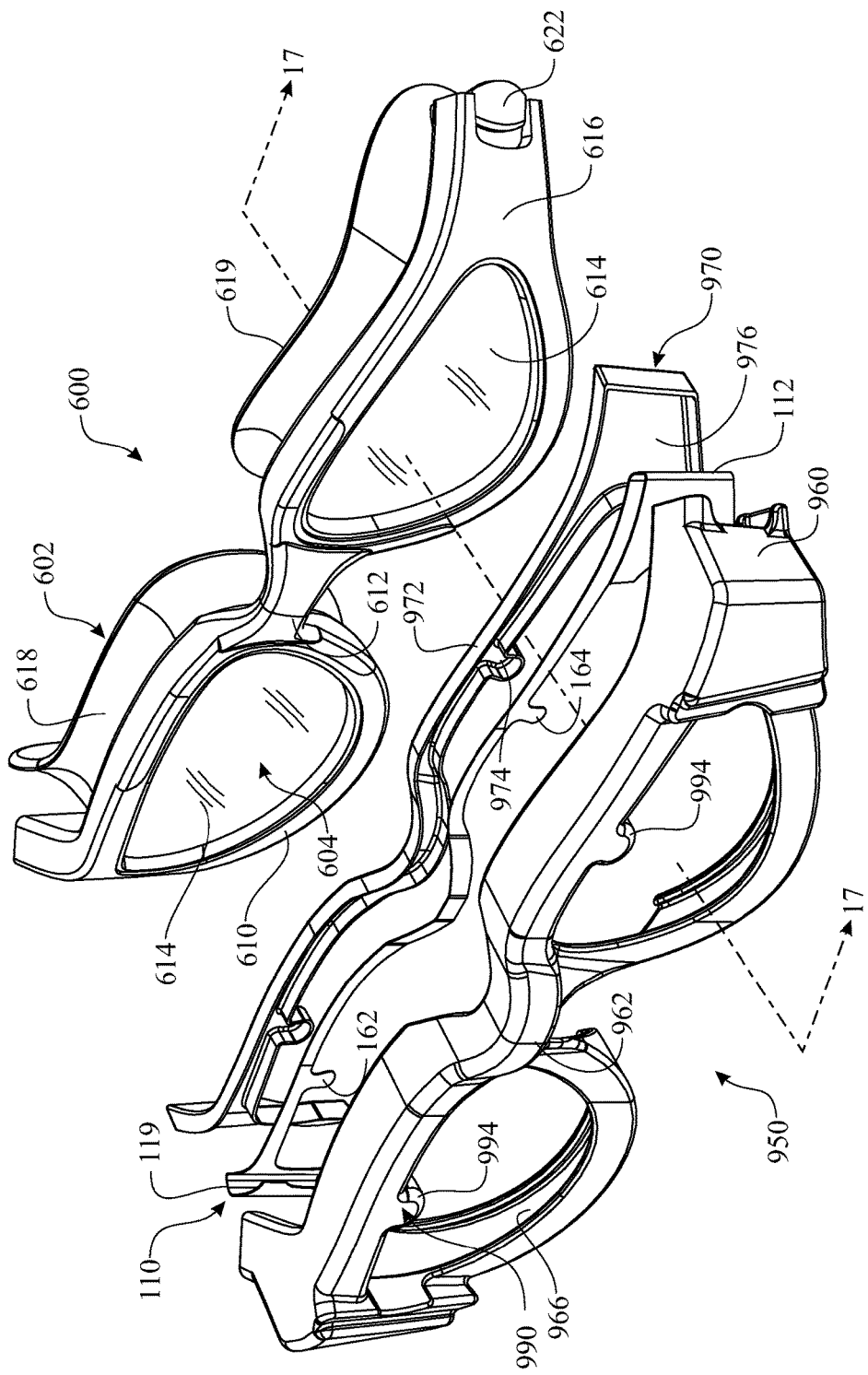
FIG. 16 presents an isometric exploded assembly view of a variant of the goggle cover assembly introduced in FIG. 10.
Figure 17:
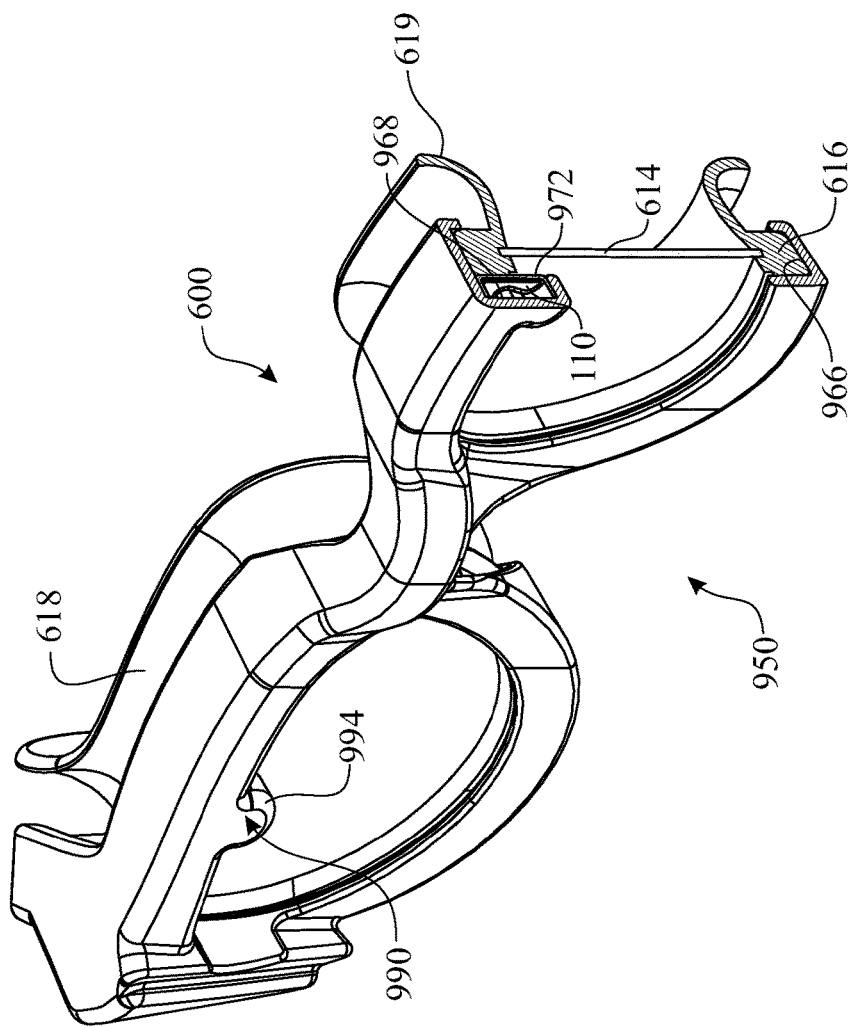
FIG. 17 presents a sectioned isometric assembly view of the goggle cover assembly introduced in FIG. 16, the section being taken along section line 17-17 of FIG. 16, wherein the section details a method of assembling the goggle cover assembly onto a pair of goggles.

Another variant of the navigation guidance goggles cover 650, 750, 850 is identified as a navigation guidance goggles cover 950 and illustrated in FIGS. 16 and 17. Like features of the navigation guidance goggles cover 950 and the navigation guidance goggles cover 650, 750, 850 are numbered the same except preceded by the numeral '9'. The illustrations include the goggles 600 to aid in describing a relationship between the navigation guidance goggles cover 950 and the goggles 600.

The navigation guidance goggles cover 950 would be shaped providing compatibility between the navigation guidance goggles cover 950 and the goggles 600, including a goggles cover bridge member 962 spanning between a pair of vision apertures. The vision apertures of the navigation guidance goggles cover 950 are shaped and sized to enable visibility through the goggles lenses 614 of the goggles 600. The navigation guidance goggles cover 950 includes a goggles cover frame 960 and a navigation PCA encapsulating cover 970 design to encase the navigation guidance printed circuit assembly (PCA) 110. The goggles cover frame 960 includes features replicating the goggles 600, including a goggles cover bridge member 962 spanning between a pair of eye loops. The navigation PCA encapsulating cover 970 includes an encapsulating cover PCA receiving cavity 976 formed within an interior surface of a navigation PCA encapsulating cover body 972. The encapsulating cover PCA receiving cavity 976 is shaped to receive the navigation guidance printed circuit assembly (PCA) 110. The navigation PCA encapsulating cover body 972 is preferably shaped to enclose the navigation guidance printed circuit assembly (PCA) 110 within the respective cavity.

The navigation guidance printed circuit assembly (PCA) 110 would include features to properly align each of the right distal visual alert component 162 and left distal visual alert component 164 within a respective visual alert distal mounting assembly 990 of the navigation guidance goggles cover 950. Similarly, the navigation PCA encapsulating cover 970 includes an encapsulating cover visual alert receiving cavity 974 for receiving and retaining the right distal visual alert component 162 and left distal visual alert component 164 at their respective locations. The goggles cover frame 960 includes a visual alert support element 994, wherein the visual alert support element 994 is located and designed to mate with the encapsulating cover visual alert receiving cavity 974. The visual alert support element 994 would preferably be opaque, thus inhibiting transmission of any light therethrough.

The navigation guidance printed circuit board (PCB) 112 of the navigation guidance system 100 would be shaped to fit within an encapsulating cover PCA receiving cavity 976 of the navigation PCA encapsulating cover 970, and/or a similar cavity formed within an interior surface of the goggles cover frame 960. This includes considerations for the associated electronic components. The navigation guidance printed circuit assembly (PCA) 110 can be designed and include features to support folding the navigation guidance printed circuit board (PCB) 112, identified as a PCB folded section 119. The PCB folded section 119 increases the useable surface area of the navigation guidance printed circuit assembly (PCA) 110, while minimizing the planar square area required to receive the navigation guidance printed circuit assembly (PCA) 110. The design of the navigation guidance goggles cover 950 can include larger distal sections of the goggles cover frame 960 outboard of each of the lens sections. The navigation guidance printed circuit assembly (PCA) 110 can be designed having larger distal sections connected by a narrow bridge section. The larger distal sections would accommodate assembly of larger components, such as the controller circuit 114, the digital data storage device 116, the portable power supply 118, the electronic compass 130, the motion sensing device 132, the electronic level 134, the optional global navigation satellite system (GNSS) receiving circuit 138 and any other associated component. The narrow bridge section would provide connectivity between the two distal ends by conductive elements, such as traces routed on the navigation guidance printed circuit board (PCB) 112. The navigation guidance printed circuit board (PCB) 112 could be shaped to accommodate the right distal visual alert component 162 and the left distal visual alert component 164 in their respective position. Each of the right distal visual alert component 162 and the left distal visual alert component 164 would preferably be assembled to the navigation guidance printed circuit board (PCB) 112 oriented facing rearward or towards the user. It is understood that a rear or interior panel of the encapsulating cover visual alert receiving cavity 974 would be transparent or translucent enabling light emitted from the respective right distal visual alert component 162 and left distal visual alert component 164 to pass therethrough. The entire navigation PCA encapsulating cover 970 can be fabricated of a transparent or translucent material.

During assembly, the navigation guidance printed circuit assembly (PCA) 110 is placed into position within either the encapsulating cover PCA receiving cavity 976 of the navigation PCA encapsulating cover 970 or within a similar cavity, identified as a goggles cover PCA receiving cavity 968, formed within the goggles cover frame 960. The navigation PCA encapsulating cover 970 is inserted into the goggles cover PCA receiving cavity 968 entrapping the navigation guidance printed circuit assembly (PCA) 110 sandwiched therebetween. The goggles cover frame 960 includes a goggles body receptacle 966. The goggles body 616 of the goggles 600 is inserted into the goggles body receptacle 966. In the exemplary design, the goggles body 616 is inserted into the goggles body receptacle 966 from the rear side of the navigation guidance goggles cover 650. Goggles commonly include a goggles pliant sealing element 618 extending outward from a rear surface of the goggles body 616. The goggles pliant sealing element 618 is shaped, defining a goggles contact surface 619 for contact with the wearer. The goggles pliant sealing element 618 would extend rearward of the rear surface of the navigation guidance goggles cover 950 after the goggles 600 and the navigation guidance goggles cover 950 are assembled to one another.

It is understood that the concept of the navigation guidance goggles cover 650, 750, 850, 950 can be adapted to other commercially available form factors, such as glasses, and the like.

The navigation guidance helmet 1000, as illustrated in FIG. 18, presents another alternative form factor for supporting the navigation guidance system 100. The navigation guidance helmet 1000 includes a helmet body 1010 designed to be worn on a user's head and protect the user's head from injury. The navigation guidance helmet 1000 can be of any known or new design, wherein the design includes specific features for an associated application. The exemplary embodiment is designed for use in conjunction with bicycling, wherein the helmet body 1010 includes a thin lightweight shell over molded upon a compressive core material, such as foam. Orientation of the navigation guidance helmet 1000 can be referenced by a helmet exterior 1002 and a helmet interior 1004.

The navigation guidance helmet 1000 can include any of the above identified user alert components, including visual alert components 152, 154, 162, 164, audible alert components 172, 174, user input devices 142, 144, 146, and the like. The design of the navigation guidance helmet 1000 would be based upon the selected user alert components.

For example, if the designer visual alert components 152, 154, 162, 164, the visual alert components 152, 154 can be integrated into an underside 1013 of a helmet visor 1012. Alternatively, the visual alert components 162, 164 (not shown in this figure) can be mounted on a visual alert distal mounting assembly, similar to the visual alert distal mounting assembly 790 of the navigation guidance goggles cover 750. If the designer elects to include audible alert components 172, 174, the helmet body 1010 can be shaped to include a pair of audible alert supporting ear cover sections 1040. Each audible alert supporting ear cover section 1040 would be sized and shaped to locate each audible alert component 172, 174 (not shown) proximate a respective user's ear. Each audible alert component 172, 174 would be mounted to an interior side of the associated audible alert supporting ear cover section 1040.

Operation of the navigation guidance system 100 within the navigation guidance helmet 1000 would be as described above.

Although the exemplary embodiments describe a variety of applications for integration of the navigation guidance system 100, it is understood that the navigation guidance system 100 can be adapted to any carrying device for any reasonable application. The programming of the navigation guidance system 100 can be modified to accommodate different scenarios.

It is also understood that the navigation guidance system 100 can be packaged into an enclosure that would be secured to the user by a strap. The direction indicators can be adapted for use in any suitable configuration, such as ear buds, tactile sensors, and the like. A pair of visual alert indicator holders can extend generally forward from the enclosure. The enclosure can include a mounting component to secure the assembly to an individual or an object, such as a bicycle, a rowing craft, and the like.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

ELEMENT DESCRIPTION REFERENCES

Ref No. Description
100 navigation guidance system
110 navigation guidance printed circuit assembly (PCA)
112 navigation guidance printed circuit board (PCB)
114 controller circuit
116 digital data storage device
118 portable power supply
119 PCB folded section
122 electro-mechanical connector
126 passive charger
128 power regulation circuit
130 electronic compass
132 motion sensing device
134 electronic level
138 optional global navigation satellite system (GNSS) receiving circuit
139 global navigation satellite system (GNSS) receiving circuit antenna
142 right tactile user input element
144 left tactile user input element
146 pneumatic user input device
150 varying level visual alert system
152 right visual alert LED series
154 left visual alert LED series
158 ambient light sensor
162 right distal visual alert component
164 left distal visual alert component
172 right audible alert component
174 left audible alert component
200 navigation guidance goggles
202 goggle exterior
204 goggle interior
210 goggle frame
212 goggle bridge member
214 goggle lens
218 goggle body
219 goggle seal contact surface
220 goggle strap
222 strap connector
240 audible alert assembly
242 audible alert locating arm
244 audible alert support element
300 starting position
302 assumed travel position
304 actual travel position
310 target destination
312 optimal travel path
320 optimal actual travel path
322 starboard/right minor deviating travel path
323 starboard/right major (severe) deviating travel path
324 starboard/right excessive deviating travel path
325 port/left minor deviating travel path
326 port/left major (severe) deviating travel path
327 port/left excessive deviating travel path
331 starboard/right travel path acceptable (slight) deviation demarcation angle
332 starboard/right travel path severe deviation demarcation angle
333 starboard/right travel path excessive deviation demarcation angle
334 port/left travel path acceptable (slight) deviation demarcation angle
335 port/left travel path severe deviation demarcation angle
336 port/left travel path excessive deviation demarcation angle
340 effective travel heading
342 corrected travel heading
344 effective corrected travel heading
350 lateral current
352 actual resulting travel path
400 navigation guidance operation flow diagram
402 initial placement of navigation system
404 navigation system activation step
410 user approaches starting position step
412 user aims device at target destination step
414 target direction programming through user interface activation step
420 user initiated travel towards target destination step
422 monitor direction of travel step
430 travel proceeding along predetermined direction decision step
432 right alert step
434 left alert step
436 acceptable travel indication step
450 drift compensating navigation guidance operation flow diagram
451 drift compensating navigation guidance operation flow diagram
452 user aims device at target destination step
454 target direction programming through user interface activation step
460 user initiated travel towards target destination step
462 monitor forward motion using the motion detecting device step
464 monitor lateral motion using the motion detecting device step
470 periodically or continuously determine the current location of the device step 472 compare actual location to anticipated location step
474 determine compensation for externally induced lateral motion step
476 adapt compass heading to compensate for lateral drift step
478 notify user of compensated navigation guidance step
480 establish incremental waypoints along desired linear travel path
482 obtain actual user location using the GNSS circuit step
484 is the user's travel path non-linear decision step
500 navigation guidance glasses
502 glasses exterior
504 glasses interior
510 glasses frame
512 glasses bridge member
514 glasses lens
520 glasses temple
540 audible alert assembly
542 audible alert locating arm
544 audible alert support element
590 peripheral visual alert support element
600 goggles
602 goggles exterior
604 goggles interior
610 goggles lens frame
612 goggles bridge member
614 goggles lens
616 goggles body
618 goggles pliant sealing element
619 goggles contact surface
620 goggles strap
622 strap connector
650 navigation guidance goggles cover
652 goggles cover exterior
654 goggles cover interior
660 goggles cover frame
662 goggles cover bridge member
666 goggles body receptacle
670 strap passageway
672 goggle integrated mechanical coupler
690 visual alert distal mounting assembly
692 visual alert locating arm
694 visual alert support element
750 navigation guidance goggles cover
752 goggles cover exterior
754 goggles cover interior
760 goggles cover frame
762 goggles cover bridge member
770 strap passageway
778 goggles body receptacle
790 visual alert distal mounting assembly
792 visual alert locating arm
794 visual alert support element
850 navigation guidance goggles cover
852 goggles cover exterior
854 goggles cover interior
860 goggles cover frame
862 goggles cover bridge member
863 bridge member coupling feature
864 goggles cover lens
868 goggles body receptacle
870 strap passageway
872 cover integrated mechanical coupler
890 visual alert distal mounting assembly
890 visual alert distal mounting assembly
892 visual alert locating arm
892 visual alert locating arm
894 visual alert support element
894 visual alert support element
950 navigation guidance goggles cover
960 goggles cover frame
962 goggles cover bridge member
966 goggles body receptacle
968 goggles cover PCA receiving cavity
970 navigation PCA encapsulating cover
972 navigation PCA encapsulating cover body
974 encapsulating cover visual alert receiving cavity
976 encapsulating cover PCA receiving cavity
990 visual alert distal mounting assembly
994 visual alert support element
1000 navigation guidance helmet
1002 helmet exterior
1004 helmet interior
1010 helmet body
1012 helmet visor
1013 helmet visor underside
1040 audible alert supporting ear cover section

What is claimed is:

1. A navigation guidance system comprising:
an enclosure having a size and shape configured to be worn on a user's head;
a controller circuit;
an electronic memory device;
an electronic compass;
a portable power supply,
wherein said controller circuit, said electronic memory device, and said electronic compass are interconnected forming a navigation guidance circuit, said navigation guidance circuit being powered by said power supply; and
a user interface in communication with the navigation guidance circuit,
wherein said navigation guidance circuit is carried by said enclosure,
wherein said electronic compass acquires compass heading information based upon an orientation of said enclosure and provides said compass heading information to said controller circuit,
wherein a desired compass bearing referencing a desired direction of travel is stored in said electronic memory device,
wherein said navigation guidance circuit compares said compass heading information of said enclosure acquired during use to said desired compass bearing and provides feedback to said user interface accordingly, indicating any deviation of said acquired compass heading information based upon said orientation of said enclosure from said stored desired compass bearing.

2. A navigation guidance system as recited in claim 1, wherein said size and shape of said enclosure is in accordance with one of: a pair of swim goggles, or a cover adapted to be attached to a pair of swim goggles.

3. A navigation guidance system as recited in claim 1, wherein said user interface is configured to be activated to provide guidance to said user to return to said stored desired compass bearing, said user interface includes at least one of:
an audible alert component,
a pair of audible alert components, wherein said pair of audible alert components includes a left audible alert component and a right audible alert component,
a visual alert component, a pair of visual alert components, wherein said pair of visual alert components includes a left visual alert component and a right visual alert component, a tactile alert component, and a pair of tactile alert components, wherein said pair of tactile alert components includes a left tactile alert component and a right tactile alert component.

4. A navigation guidance system as recited in claim 1, wherein said user interface is configured to be activated to provide guidance to said user to return to said stored desired compass bearing, said user interface includes a pair of visual alert components, wherein said pair of visual alert components includes a left visual alert component carried by a left visual alert support element supported by said enclosure and a right visual alert component carried by a right visual alert support element supported by said enclosure.

5. A navigation guidance system as recited in claim 1, further comprising a motion sensing device, wherein said motion sensing device is interconnected with said navigation guidance circuit.

6. A navigation guidance system as recited in claim 1, further comprising an electronic level circuit, wherein said electronic level circuit is interconnected with said navigation guidance circuit, wherein said electronic level circuit is adapted to determine an angle of said enclosure respective to a horizon level.

7. A navigation guidance system as recited in claim 1, wherein said user interface includes a user input device, wherein said user input device is adapted to generate an input signal when activated by a user.

8. A navigation guidance system as recited in claim 1, further comprising:

a global navigation satellite system (GNSS) receiving circuit;

wherein an actual path of travel is determined using coordinates obtained by said global navigation satellite system (GNSS) receiving circuit; and wherein feedback is provided to said user to inform said user of any deviation between said actual path of travel and said desired direction of travel.

9. A navigation guidance system as recited in claim 1, further comprising:

a global navigation satellite system (GNSS) receiving circuit in signal communication with said controller circuit;

wherein a current location of said navigation guidance system on Earth is determined using coordinates obtained by said global navigation satellite system (GNSS) receiving circuit, and wherein said location information is used to compensate for magnetic declination at said location on Earth.

10. A navigation guidance system as recited in claim 1, wherein said user interface is configured to be activated to inform said user when said compass heading information is substantially similar to said desired compass bearing, indicating that said enclosure is traveling along said desired direction of travel.

11. A navigation guidance system comprising:

an enclosure provided in a form factor of a goggles cover including a bridge member extending between a pair of viewing apertures and a goggles attachment feature adapted for attachment of said goggles cover to a pair of goggles;

a controller circuit;

an electronic memory device;

an electronic compass;

a portable power supply, wherein said controller circuit, said electronic memory device, and said electronic compass are interconnected forming a navigation guidance circuit, said navigation guidance circuit being powered by said power supply; and a user interface in communication with the navigation guidance circuit, wherein said navigation guidance circuit is carried by said enclosure, wherein said electronic compass acquires compass heading information based upon an orientation of said enclosure and provides said compass heading information to said controller circuit, wherein a desired compass bearing referencing a desired direction of travel is stored in said electronic memory device, wherein said navigation guidance circuit compares said compass heading information of said enclosure acquired during use to said desired compass bearing and provides feedback to said user interface accordingly, indicating any deviation of said acquired compass heading information based upon said orientation of said enclosure from said stored desired compass bearing.

12. A navigation guidance system as recited in claim 11, wherein said user interface is configured to be activated to provide guidance to said user to return to said stored desired compass bearing, said user interface includes at least one of:

an audible alert component, a pair of audible alert components, wherein said pair of audible alert components includes a left audible alert component and a right audible alert component, a visual alert component, a pair of visual alert components, wherein said pair of visual alert components includes a left visual alert component and a visual alert component, a tactile alert component, and a pair of tactile alert components, wherein said pair of tactile alert components includes a left tactile alert component and a right tactile alert component.

13. A navigation guidance system as recited in claim 11, wherein said user interface is configured to be activated to provide guidance to said user to return to said stored desired compass bearing, said user interface includes a pair of visual alert components, wherein said pair of visual alert components includes a left visual alert component carried by a left visual alert support element supported by said enclosure and a right visual alert component carried by a right visual alert support element supported by said enclosure.

14. A navigation guidance system as recited in claim 11, further comprising at least one of:

a motion sensing device in signal communication with said navigation guidance circuit;

an electronic level circuit in signal communication with said navigation guidance circuit, wherein said electronic level circuit is adapted to determine an angle of said device respective to a horizon level; and a user input device, wherein said user input device is adapted to generate an input signal when activated by a user.

15. A navigation guidance system as recited in claim 11, further comprising:

a global navigation satellite system (GNSS) receiving circuit;

wherein an actual path of travel is determined using coordinates obtained by said global navigation satellite system (GNSS) receiving circuit; and wherein feedback is provided to said user to inform said user of any deviation between said actual path of travel and said desired direction of travel.

16. A navigation guidance system as recited in claim 11, wherein said user interface includes a user input device, wherein in an input is obtained from said user input device; and said desired compass bearing is acquired from said electronic compass based upon said orientation of said enclosure at a moment when said input from said user input device is obtained.

17. A navigation guidance system as recited in claim 11, further comprising:

a global navigation satellite system (GNSS) receiving circuit in signal communication with said controller circuit;

wherein location information comprising a current location of said navigation guidance system on Earth is determined using coordinates obtained by said global navigation satellite system (GNSS) receiving circuit, and wherein said location information is used to compensate for magnetic declination at said location on Earth.

18. A navigation guidance system as recited in claim 11, wherein said user interface is configured to be activated to inform said user when said compass heading information is substantially similar to said desired compass bearing, indicating that said enclosure is traveling along said desired direction of travel.

19. A navigation guidance system comprising:

an enclosure, comprising at least one viewing aperture, said enclosure-having a size and shape configured to be formed into one of:

a pair of goggles, or a goggles cover adapted for attachment to a pair of goggles;

a controller circuit;

an electronic memory device;

an electronic compass;

a portable power supply, wherein said controller circuit, said electronic memory device, and said electronic compass are interconnected forming a navigation guidance circuit, said navigation guidance circuit being powered by said power supply; and a user interface in communication with the navigation guidance circuit, wherein said navigation guidance circuit is carried by said enclosure, wherein said electronic compass acquires compass heading information based upon an orientation of said enclosure and provides said compass heading information to said controller circuit, wherein a desired compass bearing referencing a desired direction of travel is stored in said electronic memory device, wherein said navigation guidance circuit compares said compass heading information of said enclosure acquired during use to said desired compass bearing and provides feedback to said user interface accordingly, indicating any deviation of said acquired compass heading information based upon said orientation of said enclosure from said stored desired compass bearing.

20. A navigation guidance system as recited in claim 19, wherein said enclosure includes a goggles cover bridge member extending between a pair of viewing apertures.

21. A navigation guidance system as recited in claim 19, wherein said user interface is configured to be activated to provide guidance to said user to return to said stored desired compass bearing, said user interface includes at least one of:

an audible alert component, a pair of audible alert components, wherein said pair of audible alert components includes a left audible alert component and a right audible alert component, a visual alert component, a pair of visual alert components, wherein said pair of visual alert components includes a left visual alert component and a right visual alert component, a tactile alert component, and a pair of tactile alert components, wherein said pair of tactile alert components includes a left tactile alert component and a right tactile alert component.

22. A navigation guidance system as recited in claim 19, wherein said user interface is configured to be activated to provide guidance to said user to return to said stored desired compass bearing, said user interface includes a pair of visual alert components, wherein said pair of visual alert components includes a left visual alert component carried by a left visual alert support element supported by said enclosure and a right visual alert component carried by a right visual alert support element supported by said enclosure.

23. A navigation guidance system as recited in claim 19, further comprising at least one of:

a motion sensing device in signal communication with said navigation guidance circuit;

an electronic level circuit in signal communication with said navigation guidance circuit, wherein said electronic level circuit is adapted to determine an angle of said device respective to a horizon level; and a user input device, wherein said user input device is adapted to generate an input signal when activated by a user.

24. A navigation guidance system as recited in claim 19, further comprising:

a global navigation satellite system (GNSS) receiving circuit, wherein an actual path of travel is determined using coordinates obtained by said global navigation satellite system (GNSS) receiving circuit; and wherein feedback is provided to said user to inform said user of any deviation between said actual path of travel and said desired direction of travel.

25. A navigation guidance system as recited in claim 19, wherein said user interface includes a user input device and an input is received from said user input device; and wherein said desired compass bearing is acquired from said electronic compass based upon said orientation of said enclosure at a moment when said input is received from said user input device.

26. A navigation guidance system as recited in claim 19, further comprising:

a global navigation satellite system (GNSS) receiving circuit in signal communication with said controller circuit;

wherein location information comprising a current location of said navigation guidance system on Earth is determined using coordinates obtained by said global navigation satellite system (GNSS) receiving circuit, and wherein said location information is used to compensate for magnetic declination at said location on Earth.

27. A navigation guidance system as recited in claim 19, wherein said user interface is configured to be activated to inform said user when said compass heading information is substantially similar to said desired compass bearing, indicating that said enclosure is traveling along said desired direction of travel.

\* \* \* \* \*